(12) United States Patent
Binder

(10) Patent No.: US 7,852,874 B2
(45) Date of Patent: *Dec. 14, 2010

(54) LOCAL AREA NETWORK OF SERIAL INTELLIGENT CELLS

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 71 days.

This patent is subject to a terminal disclaimer.

(21) Appl. No.: 12/124,860

(22) Filed: May 21, 2008

(65) Prior Publication Data

US 2008/0219288 A1 Sep. 11, 2008

Related U.S. Application Data

(60) Continuation of application No. 11/708,545, filed on Feb. 21, 2007, now Pat. No. 7,424,031, which is a continuation of application No. 10/793,769, filed on Mar. 8, 2004, now Pat. No. 7,292,600, which is a division of application No. 10/178,223, filed on Jun. 25, 2002, now Pat. No. 7,016,368, which is a continuation of application No. 09/123,486, filed on Jul. 28, 1998, now Pat. No. 6,480,510.

(51) Int. Cl.
*H04L 12/66* (2006.01)

(52) U.S. Cl. .................... 370/463; 370/478; 370/502

(58) Field of Classification Search ................ 370/463, 370/502, 479, 295, 335, 337, 342, 344, 343, 370/347, 435, 441, 254; 340/310.11
See application file for complete search history.

(56) References Cited

U.S. PATENT DOCUMENTS 404,721 A 6/1889 Messer
(Continued)

FOREIGN PATENT DOCUMENTS

DE 33 29 336 12/1983
(Continued)

OTHER PUBLICATIONS

'The Complete Modem Reference', Third Edition, by Gilbert Held, 1997, ISBN: 0-471-15457-1 (488 pages).
(Continued)

*Primary Examiner*—Chi H Pham
*Assistant Examiner*—Alexander Boakye
(74) *Attorney, Agent, or Firm*—Browdy and Neimark, PLLC

(57) ABSTRACT

A serial intelligent cell (SIC) and a connection topology for local area networks using Electrically-conducting media. A local area network can be configured from a plurality of SIC's interconnected so that all communications between two adjacent SIC's is both point-to-point and bidirectional. Each SIC can be connected to one or more other SIC's to allow redundant communication paths. Communications in different areas of a SIC network are independent of one another, so that, unlike current bus topology and star topology, there is no fundamental limit on the size or extent of a SIC network. Each SIC can optionally be connected to one or more data terminals, computers, telephones, sensors, actuators, etc., to facilitate interconnectivity among such devices. Networks according to the present invention can be configured for a variety of applications, including a local telephone system, remote computer bus extender, multiplexers, PABX/PBX functionality, security systems, and local broadcasting services. The network can use dedicated wiring, as well as existing wiring as the in-house telephone or electrical wiring.

64 Claims, 9 Drawing Sheets

U.S. PATENT DOCUMENTS

| | | |
|---|---|---|
| 405,422 A | 6/1889 | Law et al. |
| 2,032,360 A | 3/1936 | Green |
| 2,411,786 A | 11/1946 | Halstead |
| 2,577,731 A | 12/1951 | Berger |
| 2,680,162 A | 6/1954 | Brehm et al. |
| 3,045,066 A | 7/1962 | Beuscher |
| 3,280,259 A | 10/1966 | Cotter |
| 3,334,340 A | 8/1967 | McConnell |
| 3,369,078 A | 2/1968 | Stradley |
| 3,370,125 A | 2/1968 | Shaw et al. |
| 3,508,243 A | 4/1970 | Nyfeler et al. |
| 3,509,537 A | 4/1970 | Haberly |
| 3,539,727 A | 11/1970 | Pasternack |
| 3,540,030 A | 11/1970 | Hartz |
| 3,590,271 A | 6/1971 | Peters |
| 3,594,584 A | 7/1971 | Woods |
| 3,654,605 A | 4/1972 | Honda et al. |
| 3,656,112 A | 4/1972 | Paull |
| 3,659,277 A | 4/1972 | Brown |
| 3,662,366 A | 5/1972 | Neuville et al. |
| 3,683,343 A | 8/1972 | Feldman et al. |
| 3,689,886 A | 9/1972 | Durkee |
| 3,699,523 A | 10/1972 | Percher |
| 3,702,460 A | 11/1972 | Blose |
| 3,710,373 A | 1/1973 | Watanabe et al. |
| 3,714,451 A | 1/1973 | Whitney et al. |
| 3,717,858 A | 2/1973 | Hadden |
| 3,719,928 A | 3/1973 | Oishi et al. |
| 3,721,830 A | 3/1973 | Oishi et al. |
| 3,733,586 A | 5/1973 | Lusk et al. |
| 3,771,069 A | 11/1973 | Levacher et al. |
| 3,796,920 A | 3/1974 | Hedrick et al. |
| 3,806,814 A | 4/1974 | Forbes |
| 3,810,096 A | 5/1974 | Kabat et al. |
| 3,818,481 A | 6/1974 | Dorfman et al. |
| 3,835,334 A | 9/1974 | Notteau |
| 3,836,888 A | 9/1974 | Boenke et al. |
| 3,846,638 A | 11/1974 | Wetherell |
| 3,870,822 A | 3/1975 | Matthews |
| 3,876,984 A | 4/1975 | Chertok |
| 3,909,618 A | 9/1975 | Fujii et al. |
| 3,909,821 A | 9/1975 | Jagoda et al. |
| 3,911,415 A | 10/1975 | Whyte |
| 3,922,490 A | 11/1975 | Pettis |
| 3,922,664 A | 11/1975 | Wadsworth |
| 3,924,077 A | 12/1975 | Blakeslee |
| 3,924,223 A | 12/1975 | Whyte et al. |
| 3,925,728 A | 12/1975 | Whyte |
| 3,925,763 A | 12/1975 | Wadhwani et al. |
| 3,938,129 A | 2/1976 | Smither |
| 3,942,168 A | 3/1976 | Whyte |
| 3,942,170 A | 3/1976 | Whyte |
| 3,944,723 A | 3/1976 | Fong |
| 3,949,172 A | 4/1976 | Brown et al. |
| 3,959,772 A | 5/1976 | Wakasa et al. |
| 3,962,547 A | 6/1976 | Pattantyus-Abraham |
| 3,964,048 A | 6/1976 | Lusk et al. |
| 3,967,264 A | 6/1976 | Whyte et al. |
| 3,968,333 A | 7/1976 | Simokat et al. |
| 3,973,087 A | 8/1976 | Fong |
| 3,973,240 A | 8/1976 | Fong |
| 3,975,594 A | 8/1976 | Guntersdorfer |
| 3,980,954 A | 9/1976 | Whyte |
| 3,993,989 A | 11/1976 | Held et al. |
| 4,004,110 A | 1/1977 | Whyte |
| 4,008,467 A | 2/1977 | Pattantyus-Abraham et al. |
| 4,012,733 A | 3/1977 | Whyte |
| 4,012,734 A | 3/1977 | Jagoda et al. |
| 4,016,429 A | 4/1977 | Vercellotti et al. |
| 4,024,528 A | 5/1977 | Boggs et al. |
| 4,032,911 A | 6/1977 | Melvin, Jr. |
| 4,057,793 A | 11/1977 | Johnson et al. |
| 4,058,678 A | 11/1977 | Dunn et al. |
| 4,060,735 A | 11/1977 | Pascucci et al. |
| 4,065,763 A | 12/1977 | Whyte et al. |
| 4,066,912 A | 1/1978 | Wetherell |
| 4,085,678 A | 4/1978 | Heincker |
| 4,090,184 A | 5/1978 | Hamilton, II |
| 4,106,077 A | 8/1978 | Furda |
| 4,130,861 A | 12/1978 | LaForest |
| 4,130,874 A | 12/1978 | Pai |
| 4,135,181 A | 1/1979 | Bogacki et al. |
| 4,136,319 A | 1/1979 | Bourde |
| 4,139,735 A | 2/1979 | Dorfman et al. |
| 4,142,178 A | 2/1979 | Whyte et al. |
| 4,161,027 A | 7/1979 | Russell |
| 4,161,720 A | 7/1979 | Bogacki |
| 4,163,218 A | 7/1979 | Wu |
| 4,173,714 A | 11/1979 | Bloch et al. |
| 4,173,754 A | 11/1979 | Feiker |
| 4,174,517 A | 11/1979 | Mandel |
| 4,188,619 A | 2/1980 | Perkins |
| 4,197,431 A | 4/1980 | Vis |
| 4,199,761 A | 4/1980 | Whyte et al. |
| 4,200,862 A | 4/1980 | Campbell et al. |
| 4,205,360 A | 5/1980 | Drucker |
| 4,210,901 A | 7/1980 | Whyte et al. |
| 4,216,543 A | 8/1980 | Cagle et al. |
| 4,222,035 A | 9/1980 | Lohoff |
| 4,232,200 A | 11/1980 | Hestad et al. |
| 4,241,243 A | 12/1980 | Ball |
| 4,245,215 A | 1/1981 | O'Connor et al. |
| 4,250,489 A | 2/1981 | Dudash et al. |
| 4,254,403 A | 3/1981 | Perez-Cavero et al. |
| 4,270,206 A | 5/1981 | Hughes |
| 4,272,759 A | 6/1981 | Handy |
| 4,300,126 A | 11/1981 | Gajjar |
| 4,302,750 A | 11/1981 | Wadhwani et al. |
| 4,303,993 A | 12/1981 | Panepinto, Jr. et al. |
| 4,307,380 A | 12/1981 | Gander |
| 4,311,964 A | 1/1982 | Boykin |
| 4,321,581 A | 3/1982 | Tappeiner et al. |
| 4,323,882 A | 4/1982 | Gajjar |
| 4,329,678 A | 5/1982 | Hatfield |
| 4,339,750 A | 7/1982 | Delacruz |
| 4,339,816 A | 7/1982 | Reed |
| 4,344,066 A | 8/1982 | Beggs |
| 4,348,582 A | 9/1982 | Budek |
| 4,348,668 A | 9/1982 | Gurr et al. |
| 4,355,303 A | 10/1982 | Phillips et al. |
| 4,357,598 A | 11/1982 | Melvin, Jr. |
| 4,357,605 A | 11/1982 | Clements |
| 4,367,557 A | 1/1983 | Stern et al. |
| 4,371,867 A | 2/1983 | Gander |
| 4,373,117 A | 2/1983 | Pierce |
| 4,377,804 A | 3/1983 | Suzuki |
| 4,380,009 A | 4/1983 | Long et al. |
| 4,382,248 A | 5/1983 | Pai |
| 4,386,436 A | 5/1983 | Kocher et al. |
| 4,389,694 A | 6/1983 | Cornwell, Jr. |
| 4,395,590 A | 7/1983 | Pierce et al. |
| 4,400,688 A | 8/1983 | Johnston et al. |
| 4,402,059 A | 8/1983 | Kennon et al. |
| 4,408,185 A | 10/1983 | Rasmussen |
| 4,408,186 A | 10/1983 | Howell |
| 4,413,229 A | 11/1983 | Grant |
| 4,415,774 A | 11/1983 | Driver |
| 4,417,099 A | 11/1983 | Pierce |
| 4,417,207 A | 11/1983 | Sato |
| 4,418,333 A | 11/1983 | Schwarzbach et al. |
| 4,419,758 A | 12/1983 | Dorey |
| 4,427,968 A | 1/1984 | York |
| 4,429,299 A | 1/1984 | Kabat et al. |
| 4,430,639 A | 2/1984 | Bennett et al. |

| | | | | | |
|---|---|---|---|---|---|
| 4,431,869 A | 2/1984 | Sweet | 4,714,912 A | 12/1987 | Roberts et al. |
| 4,433,284 A | 2/1984 | Perkins | 4,719,616 A | 1/1988 | Akano |
| 4,433,326 A | 2/1984 | Howell | 4,724,435 A | 2/1988 | Moses et al. |
| 4,438,519 A | 3/1984 | Bose | 4,733,380 A | 3/1988 | Havira |
| 4,442,319 A | 4/1984 | Treidl | 4,733,389 A | 3/1988 | Puvogel |
| 4,458,236 A | 7/1984 | Perkins | 4,734,919 A | 3/1988 | Tae |
| 4,462,113 A | 7/1984 | Iwata | 4,736,367 A | 4/1988 | Wroblewski et al. |
| 4,463,341 A | 7/1984 | Iwasaki | 4,742,538 A | 5/1988 | Szlam |
| 4,467,314 A | 8/1984 | Weikel et al. | 4,745,391 A | 5/1988 | Gajjar |
| 4,468,792 A | 8/1984 | Baker et al. | 4,745,392 A | 5/1988 | Ise et al. |
| 4,471,399 A | 9/1984 | Udren | 4,746,809 A | 5/1988 | Coleman et al. |
| 4,473,816 A | 9/1984 | Perkins | 4,746,897 A | 5/1988 | Shuey |
| 4,473,817 A | 9/1984 | Perkins | 4,749,992 A | 6/1988 | Fitzemeyer et al. |
| 4,475,193 A | 10/1984 | Brown | 4,755,792 A | 7/1988 | Pezzolo et al. |
| 4,477,896 A | 10/1984 | Aker | 4,761,646 A | 8/1988 | Choquet et al. |
| 4,479,033 A | 10/1984 | Brown | 4,763,103 A | 8/1988 | Galula et al. |
| 4,479,215 A | 10/1984 | Baker | 4,763,104 A | 8/1988 | Inoue et al. |
| 4,481,501 A | 11/1984 | Perkins | 4,766,402 A | 8/1988 | Crane |
| 4,484,185 A | 11/1984 | Graves | 4,766,414 A | 8/1988 | Shuey |
| 4,490,683 A | 12/1984 | Rhee | 4,772,870 A | 9/1988 | Reyes |
| 4,507,721 A | 3/1985 | Yamano et al. | 4,780,714 A | 10/1988 | Moustakas et al. |
| 4,509,211 A | 4/1985 | Robbins | 4,782,322 A | 11/1988 | Lechner et al. |
| 4,510,493 A | 4/1985 | Bux et al. | 4,785,448 A | 11/1988 | Reichert et al. |
| 4,510,611 A | 4/1985 | Dougherty | 4,788,527 A | 11/1988 | Johansson |
| 4,514,594 A | 4/1985 | Brown et al. | 4,799,211 A | 1/1989 | Felker et al. |
| 4,523,307 A | 6/1985 | Brown et al. | 4,800,363 A | 1/1989 | Braun et al. |
| 4,528,667 A | 7/1985 | Fruhauf | 4,803,485 A | 2/1989 | Rypinski |
| 4,534,039 A | 8/1985 | Dodds et al. | 4,803,719 A | 2/1989 | Ulrich |
| 4,535,401 A | 8/1985 | Penn | 4,806,905 A | 2/1989 | McGowan, III et al. |
| 4,535,447 A | 8/1985 | Rosanes et al. | 4,807,225 A | 2/1989 | Fitch |
| 4,538,136 A | 8/1985 | Drabing | 4,809,296 A | 2/1989 | Braun et al. |
| 4,543,450 A | 9/1985 | Brandt | 4,809,339 A | 2/1989 | Shih et al. |
| 4,551,721 A | 11/1985 | Kozlik | 4,814,941 A | 3/1989 | Speet et al. |
| 4,556,864 A | 12/1985 | Roy | 4,815,106 A | 3/1989 | Propp et al. |
| 4,556,865 A | 12/1985 | Fukagawa et al. | 4,821,319 A | 4/1989 | Middleton et al. |
| 4,556,866 A | 12/1985 | Gorecki | 4,825,349 A | 4/1989 | Marcel |
| 4,559,520 A | 12/1985 | Johnston | 4,829,570 A | 5/1989 | Schotz |
| 4,567,557 A | 1/1986 | Burns | 4,835,517 A | 5/1989 | van der Gracht et al. |
| 4,577,333 A | 3/1986 | Lewis et al. | 4,841,281 A | 6/1989 | Melvin, Jr. |
| 4,578,533 A | 3/1986 | Pierce | 4,845,466 A | 7/1989 | Hariton et al. |
| 4,580,276 A | 4/1986 | Andruzzi, Jr. et al. | 4,847,903 A | 7/1989 | Schotz |
| 4,583,214 A | 4/1986 | Miyashita et al. | 4,864,588 A | 9/1989 | Simpson et al. |
| 4,592,069 A | 5/1986 | Redding | 4,864,589 A | 9/1989 | Endo |
| 4,593,389 A | 6/1986 | Wurzburg et al. | 4,866,602 A | 9/1989 | Hall |
| 4,597,082 A | 6/1986 | Hill et al. | 4,866,733 A | 9/1989 | Morishita |
| 4,599,598 A | 7/1986 | Komoda et al. | 4,866,757 A | 9/1989 | Nilssen |
| 4,602,240 A | 7/1986 | Perkins et al. | 4,885,563 A | 12/1989 | Johnson et al. |
| 4,609,839 A | 9/1986 | Howell | 4,885,564 A | 12/1989 | Vercellotti et al. |
| 4,611,274 A | 9/1986 | Machino et al. | 4,890,089 A | 12/1989 | Shuey |
| 4,621,170 A | 11/1986 | Picandet | 4,890,102 A | 12/1989 | Oliver |
| 4,633,217 A | 12/1986 | Akano | 4,896,277 A | 1/1990 | Vercellotti et al. |
| 4,633,218 A | 12/1986 | Palsgrove et al. | 4,896,349 A | 1/1990 | Kubo |
| 4,636,771 A | 1/1987 | Ochs | 4,899,131 A | 2/1990 | Wilk et al. |
| 4,638,298 A | 1/1987 | Spiro | 4,901,218 A | 2/1990 | Cornwell |
| 4,638,299 A | 1/1987 | Campbell | 4,903,006 A | 2/1990 | Boomgaard |
| 4,639,714 A | 1/1987 | Crowe | 4,912,553 A | 3/1990 | Pal et al. |
| 4,641,126 A | 2/1987 | Crowe | 4,914,418 A | 4/1990 | Mak et al. |
| 4,641,322 A | 2/1987 | Hasegawa | 4,918,690 A | 4/1990 | Markkula, Jr. et al. |
| 4,642,607 A | 2/1987 | Strom et al. | 4,924,492 A | 5/1990 | Gitlin et al. |
| 4,644,321 A | 2/1987 | Kennon | 4,926,158 A | 5/1990 | Zeigler |
| 4,668,934 A | 5/1987 | Shuey | 4,937,811 A | 6/1990 | Harris |
| 4,669,916 A | 6/1987 | White et al. | 4,939,728 A | 7/1990 | Markkula, Jr. et al. |
| 4,670,874 A | 6/1987 | Sato et al. | 4,953,055 A | 8/1990 | Douhet et al. |
| 4,672,605 A | 6/1987 | Hustig et al. | 4,955,018 A | 9/1990 | Twitty et al. |
| 4,675,648 A | 6/1987 | Roth et al. | 4,962,496 A | 10/1990 | Vercellotti et al. |
| 4,677,646 A | 6/1987 | Dodds et al. | 4,963,853 A | 10/1990 | Mak |
| 4,686,382 A | 8/1987 | Shuey | 4,968,970 A | 11/1990 | LaPorte |
| 4,686,641 A | 8/1987 | Evans | 4,969,147 A | 11/1990 | Markkula, Jr. et al. |
| 4,691,344 A | 9/1987 | Brown et al. | 4,973,940 A | 11/1990 | Sakai et al. |
| 4,692,761 A | 9/1987 | Robinton | 4,973,954 A | 11/1990 | Schwarz |
| 4,697,166 A | 9/1987 | Warnagiris et al. | 4,979,183 A | 12/1990 | Cowart |
| 4,701,945 A | 10/1987 | Pedigo | 4,988,972 A | 1/1991 | Takagi |
| 4,703,306 A | 10/1987 | Barritt | 4,991,221 A | 2/1991 | Rush |

| Patent No. | Kind | Date | Inventor |
|---|---|---|---|
| 4,992,774 | A | 2/1991 | McCullough |
| 5,001,774 | A | 3/1991 | Lee |
| 5,003,457 | A | 3/1991 | Ikei et al. |
| 5,010,399 | A | 4/1991 | Goodman et al. |
| 5,014,308 | A | 5/1991 | Fox |
| 5,018,138 | A | 5/1991 | Twitty et al. |
| 5,021,779 | A | 6/1991 | Bisak |
| 5,025,443 | A | 6/1991 | Gupta |
| 5,029,334 | A | 7/1991 | Braun et al. |
| 5,032,819 | A | 7/1991 | Sakuragi et al. |
| 5,032,833 | A | 7/1991 | Laporte |
| 5,033,062 | A | 7/1991 | Morrow et al. |
| 5,033,112 | A | 7/1991 | Bowling et al. |
| 5,034,531 | A | 7/1991 | Friary |
| 5,034,882 | A | 7/1991 | Eisenhard et al. |
| 5,034,883 | A | 7/1991 | Donaldson et al. |
| 5,049,876 | A | 9/1991 | Kahle et al. |
| 5,051,720 | A | 9/1991 | Kittirutsunetorn |
| 5,063,563 | A | 11/1991 | Ikeda et al. |
| 5,065,133 | A | 11/1991 | Howard |
| 5,066,939 | A | 11/1991 | Mansfield, Jr. |
| 5,068,890 | A | 11/1991 | Nilssen |
| 5,070,442 | A | 12/1991 | Syron-Townson et al. |
| 5,070,522 | A | 12/1991 | Nilssen |
| 5,089,927 | A | 2/1992 | Bulan et al. |
| 5,089,974 | A | 2/1992 | Demeyer et al. |
| 5,090,024 | A | 2/1992 | Vander Mey et al. |
| 5,093,828 | A | 3/1992 | Braun et al. |
| 5,099,444 | A | 3/1992 | Wilson et al. |
| 5,109,222 | A | 4/1992 | Welty |
| 5,113,498 | A | 5/1992 | Evan et al. |
| 5,121,482 | A | 6/1992 | Patton |
| 5,125,077 | A | 6/1992 | Hall |
| 5,144,544 | A | 9/1992 | Jenneve et al. |
| 5,146,471 | A | 9/1992 | Cowart |
| 5,148,144 | A | 9/1992 | Sutterlin et al. |
| 5,150,365 | A | 9/1992 | Hirata et al. |
| 5,151,838 | A | 9/1992 | Dockery |
| 5,155,466 | A | 10/1992 | Go |
| 5,157,711 | A | 10/1992 | Shimanuki |
| 5,161,021 | A | 11/1992 | Tsai |
| 5,168,510 | A | 12/1992 | Hill |
| 5,175,764 | A | 12/1992 | Patel et al. |
| 5,181,240 | A | 1/1993 | Sakuragi et al. |
| 5,185,591 | A | 2/1993 | Shuey |
| 5,187,865 | A | 2/1993 | Dolin, Jr. |
| 5,192,231 | A | 3/1993 | Dolin, Jr. |
| 5,198,796 | A | 3/1993 | Hessling, Jr. |
| 5,210,518 | A | 5/1993 | Graham et al. |
| 5,210,519 | A | 5/1993 | Moore |
| 5,210,788 | A | 5/1993 | Nilssen |
| 5,216,704 | A | 6/1993 | Williams et al. |
| 5,220,597 | A | 6/1993 | Horiuchi |
| 5,224,154 | A | 6/1993 | Aldridge et al. |
| 5,241,283 | A | 8/1993 | Sutterlin |
| 5,247,347 | A | 9/1993 | Litteral et al. |
| 5,255,267 | A | 10/1993 | Hansen et al. |
| 5,257,006 | A | 10/1993 | Graham et al. |
| 5,262,755 | A | 11/1993 | Mak et al. |
| 5,263,046 | A | 11/1993 | Vander Mey |
| 5,264,823 | A | 11/1993 | Stevens |
| 5,268,666 | A | 12/1993 | Michel et al. |
| 5,268,676 | A | 12/1993 | Asprey et al. |
| 5,274,631 | A | 12/1993 | Bhardwaj |
| 5,278,862 | A | 1/1994 | Vander Mey |
| 5,285,477 | A | 2/1994 | Leonowich |
| 5,289,359 | A | 2/1994 | Ziermann |
| 5,289,476 | A | 2/1994 | Johnson et al. |
| 5,311,114 | A | 5/1994 | Sambamurthy et al. |
| 5,311,518 | A | 5/1994 | Takato et al. |
| 5,311,593 | A | 5/1994 | Carmi |
| 5,319,571 | A | 6/1994 | Langer et al. |
| 5,319,634 | A | 6/1994 | Bartholomew et al. |
| 5,323,461 | A | 6/1994 | Rosenbaum et al. |
| 5,334,975 | A | 8/1994 | Wachob et al. |
| 5,343,240 | A | 8/1994 | Yu |
| 5,343,514 | A | 8/1994 | Snyder |
| 5,345,437 | A | 9/1994 | Ogawa |
| 5,347,549 | A | 9/1994 | Baumann |
| 5,349,644 | A | 9/1994 | Massey et al. |
| 5,351,272 | A | 9/1994 | Abraham |
| 5,352,957 | A | 10/1994 | Werner |
| 5,353,409 | A | 10/1994 | Asprey et al. |
| 5,355,114 | A | 10/1994 | Sutterlin et al. |
| 5,356,311 | A | 10/1994 | Liu |
| 5,368,041 | A | 11/1994 | Shambroom |
| 5,369,356 | A | 11/1994 | Kinney et al. |
| 5,375,051 | A | 12/1994 | Decker et al. |
| 5,381,804 | A | 1/1995 | Shambroom |
| 5,391,932 | A | 2/1995 | Small et al. |
| 5,396,636 | A | 3/1995 | Gallagher et al. |
| 5,400,068 | A | 3/1995 | Ishida et al. |
| 5,400,246 | A | 3/1995 | Wilson et al. |
| 5,404,127 | A | 4/1995 | Lee et al. |
| 5,406,248 | A | 4/1995 | Le Van Suu |
| 5,406,249 | A | 4/1995 | Pettus |
| 5,406,260 | A | 4/1995 | Cummings et al. |
| 5,410,292 | A | 4/1995 | Le Van Suu |
| 5,410,535 | A | 4/1995 | Yang et al. |
| 5,412,369 | A | 5/1995 | Kirchner |
| 5,414,708 | A | 5/1995 | Webber et al. |
| 5,420,578 | A | 5/1995 | O'Brien et al. |
| 5,420,886 | A | 5/1995 | Ohmori |
| 5,421,030 | A | 5/1995 | Baran |
| 5,422,519 | A | 6/1995 | Russell |
| 5,424,710 | A | 6/1995 | Baumann |
| 5,428,682 | A | 6/1995 | Apfel |
| 5,438,678 | A | 8/1995 | Smith |
| 5,440,335 | A | 8/1995 | Beveridge |
| 5,446,905 | A | 8/1995 | Koshiishi |
| 5,448,593 | A | 9/1995 | Hill |
| 5,450,393 | A | 9/1995 | Watanabe et al. |
| 5,451,923 | A | 9/1995 | Seberger et al. |
| 5,452,344 | A | 9/1995 | Larson |
| 5,454,008 | A | 9/1995 | Baumann et al. |
| 5,457,629 | A | 10/1995 | Miller et al. |
| 5,459,459 | A | 10/1995 | Lee, Jr. |
| 5,461,629 | A | 10/1995 | Sutterlin et al. |
| 5,461,671 | A | 10/1995 | Sakuragi et al. |
| 5,467,011 | A | 11/1995 | Hunt |
| 5,469,150 | A | 11/1995 | Sitte |
| 5,471,190 | A | 11/1995 | Zimmermann |
| 5,475,363 | A | 12/1995 | Suzuki et al. |
| 5,475,687 | A | 12/1995 | Markkula, Jr. et al. |
| 5,477,091 | A | 12/1995 | Fiorina et al. |
| 5,483,230 | A | 1/1996 | Mueller |
| 5,483,574 | A | 1/1996 | Yuyama |
| 5,483,656 | A | 1/1996 | Oprescu et al. |
| 5,485,040 | A | 1/1996 | Sutterlin |
| 5,491,402 | A | 2/1996 | Small |
| 5,491,463 | A | 2/1996 | Sargeant et al. |
| 5,497,142 | A | 3/1996 | Chaffanjon |
| 5,504,454 | A | 4/1996 | Daggett et al. |
| 5,517,172 | A | 5/1996 | Chiu |
| 5,521,491 | A | 5/1996 | Najam |
| 5,525,962 | A | 6/1996 | Tice |
| 5,528,089 | A | 6/1996 | Guiset et al. |
| 5,530,748 | A | 6/1996 | Ohmori |
| 5,533,101 | A | 7/1996 | Miyagawa |
| 5,535,336 | A | 7/1996 | Smith et al. |
| 5,539,805 | A | 7/1996 | Bushue et al. |
| 5,544,243 | A | 8/1996 | Papadopoulos |
| 5,546,385 | A | 8/1996 | Caspi et al. |
| 5,548,614 | A | 8/1996 | Stoll et al. |
| 5,553,138 | A | 9/1996 | Heald et al. |
| 5,554,968 | A | 9/1996 | Lee |

| | | | | | |
|---|---|---|---|---|---|
| 5,559,377 A | 9/1996 | Abraham | 5,815,681 A | 9/1998 | Kikinis |
| 5,563,515 A | 10/1996 | Kako | 5,818,127 A | 10/1998 | Abraham |
| 5,568,547 A | 10/1996 | Nishimura | 5,818,710 A | 10/1998 | LeVan Suu |
| 5,570,085 A | 10/1996 | Bertsch | 5,818,821 A | 10/1998 | Schurig |
| 5,572,182 A | 11/1996 | De Pinho et al. | 5,822,677 A | 10/1998 | Peyrovian |
| 5,574,748 A | 11/1996 | Vander Mey et al. | 5,822,678 A | 10/1998 | Evanyk |
| 5,579,221 A | 11/1996 | Mun | 5,828,293 A | 10/1998 | Rickard |
| 5,579,335 A | 11/1996 | Sutterlin et al. | 5,828,558 A | 10/1998 | Korcharz et al. |
| 5,579,486 A | 11/1996 | Oprescu et al. | 5,832,364 A | 11/1998 | Gustafson |
| 5,581,229 A | 12/1996 | Hunt | 5,835,005 A | 11/1998 | Furukawa et al. |
| 5,581,801 A | 12/1996 | Spriester et al. | 5,838,989 A | 11/1998 | Hutchison et al. |
| 5,583,934 A | 12/1996 | Zhou | 5,841,360 A | 11/1998 | Binder |
| 5,592,482 A | 1/1997 | Abraham | 5,841,841 A | 11/1998 | Dodds et al. |
| 5,608,792 A | 3/1997 | Laidler | 5,842,032 A | 11/1998 | Bertsch |
| 5,610,552 A | 3/1997 | Schlesinger et al. | 5,844,596 A | 12/1998 | Goodman |
| 5,610,922 A | 3/1997 | Balatoni | 5,844,789 A | 12/1998 | Wynn |
| 5,613,130 A | 3/1997 | Teng et al. | 5,844,888 A | 12/1998 | Markkula et al. |
| 5,614,811 A | 3/1997 | Sagalovich et al. | 5,844,949 A | 12/1998 | Hershey et al. |
| 5,625,863 A | 4/1997 | Abraham | 5,845,190 A | 12/1998 | Bushue et al. |
| 5,630,204 A | 5/1997 | Hylton et al. | 5,848,054 A | 12/1998 | Mosebrook et al. |
| 5,635,896 A | 6/1997 | Tinsley et al. | 5,848,376 A | 12/1998 | Steiner et al. |
| 5,644,286 A | 7/1997 | Brosh et al. | 5,859,584 A | 1/1999 | Counsell et al. |
| 5,651,696 A | 7/1997 | Jennison | 5,859,596 A | 1/1999 | McRae |
| 5,652,893 A | 7/1997 | Ben-Meir et al. | 5,864,284 A | 1/1999 | Sanderson |
| 5,659,608 A | 8/1997 | Stiefel | 5,870,016 A | 2/1999 | Shrestha |
| 5,671,220 A | 9/1997 | Tonomura | 5,878,047 A | 3/1999 | Ganek et al. |
| 5,675,813 A | 10/1997 | Holmdahl | 5,878,133 A | 3/1999 | Zhou et al. |
| 5,680,397 A | 10/1997 | Christensen et al. | 5,884,086 A | 3/1999 | Amoni et al. |
| 5,682,423 A | 10/1997 | Walker | 5,886,732 A | 3/1999 | Humpleman |
| 5,684,450 A | 11/1997 | Brown | 5,892,430 A | 4/1999 | Weisman et al. |
| 5,684,826 A | 11/1997 | Ratner | 5,892,792 A | 4/1999 | Walley |
| 5,689,230 A | 11/1997 | Merwin et al. | 5,892,795 A | 4/1999 | Paret |
| 5,689,242 A | 11/1997 | Sims et al. | 5,896,443 A | 4/1999 | Dichter |
| 5,691,691 A | 11/1997 | Merwin et al. | 5,896,556 A | 4/1999 | Moreland et al. |
| 5,694,108 A | 12/1997 | Shuey | 5,898,347 A | 4/1999 | Harford |
| 5,696,790 A | 12/1997 | Graham et al. | 5,903,213 A | 5/1999 | Hodge et al. |
| 5,696,861 A | 12/1997 | Schimmeyer et al. | 5,903,594 A | 5/1999 | Saulnier et al. |
| 5,699,276 A | 12/1997 | Roos | 5,905,442 A | 5/1999 | Mosebrook et al. |
| 5,705,974 A | 1/1998 | Patel et al. | 5,911,119 A | 6/1999 | Bartholomew et al. |
| 5,706,007 A | 1/1998 | Fragnito et al. | 5,917,624 A | 6/1999 | Wagner |
| 5,706,157 A | 1/1998 | Galecki et al. | 5,922,047 A | 7/1999 | Newlin et al. |
| 5,708,701 A | 1/1998 | Houvig et al. | 5,929,748 A | 7/1999 | Odinak |
| 5,712,614 A | 1/1998 | Patel et al. | 5,929,749 A | 7/1999 | Slonim et al. |
| 5,717,685 A | 2/1998 | Abraham | 5,929,896 A | 7/1999 | Goodman |
| 5,726,980 A | 3/1998 | Rickard | 5,930,340 A | 7/1999 | Bell |
| 5,727,004 A | 3/1998 | Propp et al. | 5,933,073 A | 8/1999 | Shuey |
| 5,727,025 A | 3/1998 | Maryanka | 5,937,342 A | 8/1999 | Kline |
| 5,731,664 A | 3/1998 | Posa | 5,938,757 A | 8/1999 | Bertsch |
| 5,736,965 A | 4/1998 | Mosebrook et al. | 5,939,801 A | 8/1999 | Bouffard et al. |
| 5,742,527 A | 4/1998 | Rybicki et al. | 5,940,400 A | 8/1999 | Eastmond et al. |
| 5,748,104 A | 5/1998 | Argyroudis et al. | 5,944,831 A | 8/1999 | Pate et al. |
| 5,748,634 A | 5/1998 | Sokol et al. | 5,949,327 A | 9/1999 | Brown |
| 5,748,671 A | 5/1998 | Sutterlin et al. | 5,949,473 A | 9/1999 | Goodman |
| 5,754,539 A | 5/1998 | Metz et al. | 5,952,914 A | 9/1999 | Wynn |
| 5,757,936 A | 5/1998 | Lee | 5,960,066 A | 9/1999 | Hartmann et al. |
| 5,774,526 A | 6/1998 | Propp et al. | 5,960,208 A | 9/1999 | Obata et al. |
| 5,774,789 A | 6/1998 | Van Der Kaay et al. | 5,963,539 A | 10/1999 | Webber, Jr. et al. |
| 5,777,544 A | 7/1998 | Vander Mey et al. | 5,963,595 A | 10/1999 | Graham et al. |
| 5,777,545 A | 7/1998 | Patel et al. | 5,963,844 A | 10/1999 | Dail |
| 5,777,769 A | 7/1998 | Coutinho | 5,973,942 A | 10/1999 | Nelson et al. |
| 5,778,303 A | 7/1998 | Shinozaki et al. | 5,974,553 A | 10/1999 | Gandar |
| 5,781,844 A | 7/1998 | Spriester et al. | 5,977,650 A | 11/1999 | Rickard et al. |
| 5,796,739 A | 8/1998 | Kim | 5,977,913 A | 11/1999 | Christ |
| 5,796,965 A | 8/1998 | Choi et al. | 5,978,373 A | 11/1999 | Hoff et al. |
| 5,799,069 A | 8/1998 | Weston et al. | 5,982,052 A | 11/1999 | Sosnowski |
| 5,799,196 A | 8/1998 | Flannery | 5,982,276 A | 11/1999 | Stewart |
| 5,801,635 A | 9/1998 | Price | 5,990,577 A | 11/1999 | Kamioka et al. |
| 5,802,173 A | 9/1998 | Hamilton-Piercy et al. | 5,991,885 A | 11/1999 | Chang et al. |
| 5,805,053 A | 9/1998 | Patel et al. | 5,994,998 A | 11/1999 | Fisher et al. |
| 5,805,591 A | 9/1998 | Naboulsi et al. | 6,005,476 A | 12/1999 | Valiulis |
| 5,805,597 A | 9/1998 | Edem | 6,009,465 A | 12/1999 | Decker et al. |
| 5,805,806 A | 9/1998 | McArthur | 6,009,479 A | 12/1999 | Jeffries |
| 5,815,086 A | 9/1998 | Ivie et al. | 6,011,794 A | 1/2000 | Mordowitz et al. |

| | | |
|---|---|---|
| 6,014,386 A | 1/2000 | Abraham |
| 6,016,519 A | 1/2000 | Chida et al. |
| 6,018,690 A | 1/2000 | Saito et al. |
| 6,025,945 A | 2/2000 | Nyu et al. |
| 6,026,078 A | 2/2000 | Smith |
| 6,033,101 A | 3/2000 | Reddick et al. |
| 6,034,988 A | 3/2000 | VanderMey et al. |
| 6,037,678 A | 3/2000 | Rickard |
| 6,038,425 A | 3/2000 | Jeffrey |
| 6,038,457 A | 3/2000 | Barkat |
| 6,040,759 A | 3/2000 | Sanderson |
| 6,049,471 A | 4/2000 | Korcharz et al. |
| 6,049,881 A | 4/2000 | Massman et al. |
| 6,055,435 A | 4/2000 | Smith et al. |
| 6,055,633 A | 4/2000 | Schrier et al. |
| 6,069,588 A | 5/2000 | O'Neill |
| 6,069,890 A | 5/2000 | White et al. |
| 6,069,899 A | 5/2000 | Foley |
| 6,081,519 A | 6/2000 | Petler |
| 6,081,533 A | 6/2000 | Laubach et al. |
| 6,084,758 A | 7/2000 | Clarey et al. |
| 6,087,835 A | 7/2000 | Haneda |
| 6,087,860 A | 7/2000 | Liu et al. |
| 6,095,867 A | 8/2000 | Brandt et al. |
| 6,097,761 A | 8/2000 | Buhring et al. |
| 6,104,707 A | 8/2000 | Abraham |
| 6,107,656 A | 8/2000 | Igarashi |
| 6,107,912 A | 8/2000 | Bullock et al. |
| 6,108,330 A | 8/2000 | Bhatia et al. |
| 6,109,959 A | 8/2000 | Burlinson et al. |
| 6,111,764 A | 8/2000 | Atou et al. |
| 6,114,632 A | 9/2000 | Planas, Sr. et al. |
| 6,115,429 A | 9/2000 | Huang |
| 6,115,468 A | 9/2000 | DeNicolo |
| 6,115,755 A | 9/2000 | Krishan |
| 6,115,822 A | 9/2000 | Kim et al. |
| 6,123,577 A | 9/2000 | Contois et al. |
| 6,125,448 A | 9/2000 | Schwan et al. |
| 6,126,463 A | 10/2000 | Okazaki et al. |
| 6,127,925 A | 10/2000 | Bonsignore et al. |
| 6,128,743 A | 10/2000 | Rothenbaum |
| 6,130,896 A | 10/2000 | Lueker et al. |
| 6,137,865 A | 10/2000 | Ripy et al. |
| 6,141,763 A | 10/2000 | Smith et al. |
| 6,144,292 A | 11/2000 | Brown |
| 6,151,330 A | 11/2000 | Liberman |
| 6,151,480 A | 11/2000 | Fischer et al. |
| 6,154,488 A | 11/2000 | Hunt |
| 6,157,292 A | 12/2000 | Piercy et al. |
| 6,157,645 A | 12/2000 | Shobatake |
| 6,157,716 A | 12/2000 | Ortel |
| 6,160,795 A | 12/2000 | Hosemann |
| 6,166,496 A | 12/2000 | Lys et al. |
| 6,167,120 A | 12/2000 | Kikinis |
| 6,175,556 B1 | 1/2001 | Allen, Jr. et al. |
| 6,175,860 B1 | 1/2001 | Gaucher |
| 6,177,884 B1 | 1/2001 | Hunt et al. |
| 6,178,514 B1 | 1/2001 | Wood |
| 6,181,783 B1 | 1/2001 | Goodman |
| 6,185,284 B1 | 2/2001 | Goodman |
| 6,188,314 B1 | 2/2001 | Wallace et al. |
| 6,188,557 B1 | 2/2001 | Chaudhry |
| 6,192,399 B1 | 2/2001 | Goodman |
| 6,208,637 B1 | 3/2001 | Eames |
| 6,212,274 B1 | 4/2001 | Ninh |
| 6,212,658 B1 | 4/2001 | Le Van Suu |
| 6,215,789 B1 | 4/2001 | Keenan et al. |
| 6,216,160 B1 | 4/2001 | Dichter |
| 6,218,930 B1 | 4/2001 | Katzenberg et al. |
| 6,218,931 B1 | 4/2001 | Asghar et al. |
| 6,219,409 B1 | 4/2001 | Smith et al. |
| 6,227,499 B1 | 5/2001 | Jennison et al. |
| 6,229,433 B1 | 5/2001 | Rye et al. |
| 6,236,664 B1 | 5/2001 | Erreygers |
| 6,236,718 B1 | 5/2001 | Goodman |
| 6,240,166 B1 | 5/2001 | Collin et al. |
| 6,243,413 B1 | 6/2001 | Beukema |
| 6,243,446 B1 | 6/2001 | Goodman |
| 6,243,571 B1 | 6/2001 | Bullock et al. |
| 6,243,818 B1 | 6/2001 | Schwan et al. |
| 6,246,748 B1 | 6/2001 | Yano |
| 6,246,868 B1 | 6/2001 | Bullock et al. |
| 6,249,213 B1 | 6/2001 | Horne |
| 6,252,754 B1 | 6/2001 | Chaudhry |
| 6,252,755 B1 | 6/2001 | Willer |
| 6,252,957 B1 | 6/2001 | Jauregui et al. |
| 6,256,518 B1 | 7/2001 | Buhrmann |
| 6,272,551 B1 | 8/2001 | Martin et al. |
| 6,275,144 B1 | 8/2001 | Rumbaugh |
| 6,281,784 B1 | 8/2001 | Redgate et al. |
| 6,282,075 B1 | 8/2001 | Chaudhry |
| 6,282,189 B1 | 8/2001 | Eames |
| 6,282,405 B1 | 8/2001 | Brown |
| 6,283,789 B1 | 9/2001 | Tsai |
| 6,288,631 B1 | 9/2001 | Shinozaki et al. |
| 6,288,632 B1 | 9/2001 | Hoctor et al. |
| 6,290,141 B1 | 9/2001 | Park et al. |
| 6,292,517 B1 | 9/2001 | Collin et al. |
| 6,295,356 B1 | 9/2001 | De Nicolo |
| 6,300,881 B1 | 10/2001 | Yee et al. |
| 6,301,527 B1 | 10/2001 | Butland et al. |
| 6,308,215 B1 | 10/2001 | Kolbet et al. |
| 6,308,240 B1 | 10/2001 | De Nicolo |
| 6,310,286 B1 | 10/2001 | Troxel et al. |
| 6,310,781 B1 | 10/2001 | Karam |
| 6,317,839 B1 | 11/2001 | Wells |
| 6,317,884 B1 | 11/2001 | Eames et al. |
| 6,320,494 B1 | 11/2001 | Bartels et al. |
| 6,320,866 B2 | 11/2001 | Wolf et al. |
| 6,320,900 B1 | 11/2001 | Liu |
| 6,331,814 B1 | 12/2001 | Albano et al. |
| 6,346,875 B1 | 2/2002 | Puckette et al. |
| 6,348,874 B1 | 2/2002 | Cole et al. |
| 6,348,875 B1 | 2/2002 | Odinak et al. |
| 6,349,133 B1 | 2/2002 | Matthews et al. |
| 6,357,011 B2 | 3/2002 | Gilbert |
| 6,362,610 B1 | 3/2002 | Yang |
| 6,363,066 B1 | 3/2002 | Frimodig |
| 6,364,535 B1 | 4/2002 | Coffey |
| 6,366,143 B1 | 4/2002 | Liu et al. |
| 6,373,377 B1 | 4/2002 | Sacca et al. |
| 6,377,163 B1 | 4/2002 | Deller et al. |
| 6,377,874 B1 | 4/2002 | Ykema |
| 6,383,076 B1 | 5/2002 | Tiedeken |
| 6,385,024 B1 | 5/2002 | Olson |
| 6,389,139 B1 | 5/2002 | Curtis et al. |
| 6,393,050 B1 | 5/2002 | Liu |
| 6,393,607 B1 | 5/2002 | Hughes et al. |
| 6,396,391 B1 | 5/2002 | Binder |
| 6,396,392 B1 | 5/2002 | Abraham |
| 6,396,393 B2 | 5/2002 | Yuasa |
| 6,404,773 B1 | 6/2002 | Williams et al. |
| 6,407,987 B1 | 6/2002 | Abraham |
| 6,414,952 B2 | 7/2002 | Foley |
| 6,417,762 B1 | 7/2002 | Comer |
| 6,430,199 B1 | 8/2002 | Kerpez |
| 6,433,672 B1 | 8/2002 | Shirmard |
| 6,438,109 B1 | 8/2002 | Karaoguz et al. |
| 6,441,723 B1 | 8/2002 | Mansfield, Jr. et al. |
| 6,442,129 B1 | 8/2002 | Yonge, III et al. |
| 6,445,087 B1 | 9/2002 | Wang et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,459,175 B1 | 10/2002 | Potega |
| 6,459,275 B1 | 10/2002 | Ewalt et al. |

| | | |
|---|---|---|
| 6,459,692 B1 | 10/2002 | Ben-Michael et al. |
| 6,463,051 B1 | 10/2002 | Ford |
| 6,470,053 B1 | 10/2002 | Liu |
| 6,470,401 B1 | 10/2002 | Peterson |
| 6,473,608 B1 | 10/2002 | Lehr et al. |
| 6,477,457 B1 | 11/2002 | Fendt et al. |
| 6,480,122 B1 | 11/2002 | Oddy et al. |
| 6,480,510 B1 | 11/2002 | Binder |
| 6,481,013 B1 | 11/2002 | Dinwiddie et al. |
| 6,483,902 B1 | 11/2002 | Stewart et al. |
| 6,493,875 B1 | 12/2002 | Eames et al. |
| 6,496,103 B1 | 12/2002 | Weiss et al. |
| 6,496,104 B2 | 12/2002 | Kline |
| 6,501,389 B1 | 12/2002 | Aguirre |
| 6,510,204 B2 | 1/2003 | De Clercq et al. |
| 6,518,724 B2 | 2/2003 | Janik |
| 6,522,515 B1 | 2/2003 | Whitney |
| 6,522,662 B1 | 2/2003 | Liu |
| 6,526,516 B1 | 2/2003 | Ishikawa et al. |
| 6,526,581 B1 | 2/2003 | Edson |
| 6,529,443 B2 | 3/2003 | Downey, Jr. et al. |
| 6,535,110 B1 | 3/2003 | Arora et al. |
| 6,535,587 B1 | 3/2003 | Kobayashi |
| 6,535,983 B1 | 3/2003 | McCormack et al. |
| 6,539,011 B1 | 3/2003 | Keenan et al. |
| 6,539,484 B1 | 3/2003 | Cruz |
| 6,541,878 B1 | 4/2003 | Diab |
| 6,542,585 B2 | 4/2003 | Goodman |
| 6,546,494 B1 | 4/2003 | Jackson et al. |
| 6,549,120 B1 | 4/2003 | de Buda |
| 6,553,076 B1 | 4/2003 | Huang |
| 6,556,097 B2 | 4/2003 | Coffey |
| 6,556,564 B2 | 4/2003 | Rogers |
| 6,556,581 B1 | 4/2003 | He et al. |
| 6,559,757 B1 | 5/2003 | Deller et al. |
| 6,560,333 B1 | 5/2003 | Consiglio et al. |
| 6,563,418 B1 | 5/2003 | Moon |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,571,181 B1 | 5/2003 | Rakshani et al. |
| 6,571,305 B1 | 5/2003 | Engler |
| 6,574,242 B1 | 6/2003 | Keenan et al. |
| 6,574,313 B1 | 6/2003 | Chea, Jr. et al. |
| 6,574,741 B1 | 6/2003 | Fujimori et al. |
| 6,577,230 B1 | 6/2003 | Wendt et al. |
| 6,577,231 B2 | 6/2003 | Litwin, Jr. et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,583,719 B2 | 6/2003 | Okada et al. |
| 6,584,197 B1 | 6/2003 | Boudreaux, Jr. et al. |
| 6,584,519 B1 | 6/2003 | Russell |
| 6,587,454 B1 | 7/2003 | Lamb |
| 6,587,479 B1 | 7/2003 | Bianchi et al. |
| 6,587,560 B1 | 7/2003 | Scott et al. |
| 6,587,739 B1 | 7/2003 | Abrams et al. |
| 6,601,097 B1 | 7/2003 | Cheston et al. |
| 6,603,220 B2 | 8/2003 | Vergnaud |
| 6,608,264 B1 | 8/2003 | Fouladpour |
| 6,611,537 B1 | 8/2003 | Edens et al. |
| 6,616,005 B1 | 9/2003 | Pereira et al. |
| 6,624,532 B1 | 9/2003 | Davidow et al. |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,662 B1 | 11/2003 | Arnaud et al. |
| 6,653,932 B1 | 11/2003 | Beamish et al. |
| 6,658,098 B2 | 12/2003 | Lamb et al. |
| 6,658,108 B1 | 12/2003 | Bissell et al. |
| 6,658,109 B1 | 12/2003 | Steinke et al. |
| 6,659,947 B1 | 12/2003 | Carter et al. |
| 6,661,892 B1 | 12/2003 | Fischer |
| 6,665,384 B2 | 12/2003 | Daum et al. |
| 6,665,404 B2 | 12/2003 | Cohen |
| 6,671,360 B2 | 12/2003 | Sumiya et al. |
| 6,671,501 B1 | 12/2003 | Dalichau |
| 6,678,321 B1 | 1/2004 | Graham et al. |
| 6,681,013 B1 | 1/2004 | Miyamoto |
| 6,686,832 B2 | 2/2004 | Abraham |
| 6,690,792 B1 | 2/2004 | Robinson et al. |
| 6,701,443 B1 | 3/2004 | Bell |
| 6,704,414 B2 | 3/2004 | Murakoshi |
| 6,704,824 B1 | 3/2004 | Goodman |
| 6,710,704 B2 | 3/2004 | Fisher et al. |
| 6,715,087 B1 | 3/2004 | Vergnaud et al. |
| 6,721,790 B1 | 4/2004 | Chen |
| 6,732,315 B2 | 5/2004 | Yagil et al. |
| 6,735,217 B1 | 5/2004 | Webber, Jr. et al. |
| 6,738,641 B1 | 5/2004 | Elsasser |
| 6,741,162 B1 | 5/2004 | Sacca et al. |
| 6,747,859 B2 | 6/2004 | Walbeck et al. |
| 6,748,078 B1 | 6/2004 | Posthuma |
| 6,755,575 B2 | 6/2004 | Kronlund et al. |
| 6,759,946 B2 | 7/2004 | Sahinoglu et al. |
| 6,760,384 B1 | 7/2004 | Garreau et al. |
| 6,762,675 B1 | 7/2004 | Cafiero et al. |
| 6,763,097 B1 | 7/2004 | Vitenberg |
| 6,763,109 B1 | 7/2004 | Hoskins |
| 6,764,343 B2 | 7/2004 | Ferentz |
| 6,771,774 B1 | 8/2004 | Phan et al. |
| 6,775,299 B1 | 8/2004 | Olson et al. |
| 6,778,549 B1 | 8/2004 | Keller |
| 6,778,646 B1 | 8/2004 | Sun |
| 6,778,817 B1 | 8/2004 | Bullock et al. |
| 6,785,532 B1 | 8/2004 | Rickard |
| 6,792,323 B2 | 9/2004 | Krzyzanowski et al. |
| 6,795,539 B2 | 9/2004 | Culli et al. |
| 6,800,957 B2 | 10/2004 | Nerone et al. |
| 6,804,351 B1 | 10/2004 | Karam |
| 6,804,828 B1 | 10/2004 | Shibata |
| 6,807,463 B1 | 10/2004 | Cunningham et al. |
| 6,815,844 B2 | 11/2004 | Kovarik |
| 6,819,760 B1 | 11/2004 | Nayler |
| 6,825,672 B1 | 11/2004 | Lo et al. |
| 6,831,921 B2 | 12/2004 | Higgins |
| 6,831,976 B1 | 12/2004 | Comerford et al. |
| 6,841,979 B2 | 1/2005 | Pincu et al. |
| 6,844,810 B2 | 1/2005 | Cern |
| 6,847,718 B1 | 1/2005 | Hiraoka |
| 6,854,059 B2 | 2/2005 | Gardner |
| 6,854,895 B2 | 2/2005 | Coffey et al. |
| 6,856,799 B1 | 2/2005 | Ritter |
| 6,862,353 B2 | 3/2005 | Rabenko et al. |
| 6,864,798 B2 | 3/2005 | Janik |
| 6,868,072 B1 | 3/2005 | Lin et al. |
| 6,868,265 B2 | 3/2005 | Zodnik |
| 6,870,282 B1 | 3/2005 | Bischoff et al. |
| 6,880,020 B1 | 4/2005 | Rubinstein et al. |
| 6,885,674 B2 | 4/2005 | Hunt et al. |
| 6,889,095 B1 | 5/2005 | Eidson et al. |
| 6,896,551 B2 | 5/2005 | Hauck et al. |
| 6,901,439 B1 | 5/2005 | Bonasia et al. |
| 6,904,134 B2 | 6/2005 | Jeon et al. |
| 6,906,618 B2 | 6/2005 | Hair, III et al. |
| 6,912,145 B2 | 6/2005 | Hung et al. |
| 6,912,282 B2 | 6/2005 | Karam |
| 6,917,681 B2 | 7/2005 | Robinson et al. |
| 6,922,135 B2 | 7/2005 | Abraham |
| 6,933,835 B2 | 8/2005 | Kline |
| 6,934,170 B2 | 8/2005 | Ooishi |
| 6,943,683 B2 | 9/2005 | Perret |
| 6,947,287 B1 | 9/2005 | Zansky et al. |
| 6,947,409 B2 | 9/2005 | Iwamura |
| 6,947,736 B2 | 9/2005 | Shaver et al. |

| | | | |
|---|---|---|---|
| 6,950,567 B2 | 9/2005 | Kline | |
| 6,952,785 B1 | 10/2005 | Diab et al. | |
| 6,954,863 B2 | 10/2005 | Mouton | |
| 6,956,462 B2 | 10/2005 | Jetzt | |
| 6,956,463 B2 | 10/2005 | Crenella et al. | |
| 6,958,680 B2 | 10/2005 | Kline | |
| 6,961,303 B1 | 11/2005 | Binder | |
| 6,963,936 B2 | 11/2005 | Billington et al. | |
| 6,965,302 B2 | 11/2005 | Mollenkopf et al. | |
| 6,965,303 B2 | 11/2005 | Mollenkopf | |
| 6,972,688 B2 | 12/2005 | Rapaich | |
| 6,973,394 B2 | 12/2005 | Jaeger et al. | |
| 6,975,209 B2 | 12/2005 | Gromov | |
| 6,975,211 B2 | 12/2005 | Atsuta et al. | |
| 6,977,507 B1 | 12/2005 | Pannell et al. | |
| 6,977,578 B2 | 12/2005 | Kline | |
| 6,980,089 B1 | 12/2005 | Kline | |
| 6,980,090 B2 | 12/2005 | Mollenkopf | |
| 6,980,091 B2 | 12/2005 | White, II et al. | |
| 6,982,611 B2 | 1/2006 | Cope | |
| 6,985,072 B2 | 1/2006 | Omidi et al. | |
| 6,985,713 B2 | 1/2006 | Lehr et al. | |
| 6,985,714 B2 | 1/2006 | Akiyama et al. | |
| 6,986,071 B2 | 1/2006 | Darshan et al. | |
| 6,987,430 B2 | 1/2006 | Wasaki et al. | |
| 6,989,734 B2 | 1/2006 | Thomas | |
| 6,995,657 B2 | 2/2006 | Zalitzky et al. | |
| 6,995,658 B2 | 2/2006 | Tustison et al. | |
| 6,996,458 B2 | 2/2006 | Pincu et al. | |
| 6,996,729 B2 | 2/2006 | Volkening et al. | |
| 6,998,962 B2 | 2/2006 | Cope et al. | |
| 6,998,964 B2 | 2/2006 | Lomax, Jr. et al. | |
| 6,999,505 B2 | 2/2006 | Yokoo et al. | |
| 7,003,102 B2 | 2/2006 | Kiko | |
| 7,007,305 B2 | 2/2006 | Carson et al. | |
| 7,009,527 B2 | 3/2006 | Seo | |
| 7,010,050 B2 | 3/2006 | Maryanka | |
| 7,016,377 B1 | 3/2006 | Chun et al. | |
| 7,023,809 B1 | 4/2006 | Rubinstein et al. | |
| 7,026,730 B1 | 4/2006 | Marshall et al. | |
| 7,026,917 B2 | 4/2006 | Berkman | |
| 7,030,733 B2 | 4/2006 | Abbarin | |
| 7,035,270 B2 | 4/2006 | Moore, Jr. et al. | |
| 7,035,280 B2 | 4/2006 | Binder | |
| 7,046,124 B2 | 5/2006 | Cope et al. | |
| 7,046,882 B2 | 5/2006 | Kline | |
| 7,046,983 B2 | 5/2006 | Elkayam et al. | |
| 7,049,514 B2 | 5/2006 | Brandt et al. | |
| 7,049,939 B2 | 5/2006 | Ikeda et al. | |
| 7,053,501 B1 | 5/2006 | Barrass | |
| 7,053,756 B2 | 5/2006 | Mollenkopf et al. | |
| 7,061,142 B1 | 6/2006 | Marshall | |
| 7,064,654 B2 | 6/2006 | Berkman et al. | |
| 7,068,781 B2 | 6/2006 | Le Creff et al. | |
| 7,072,408 B2 | 7/2006 | Gehlot et al. | |
| 7,072,995 B1 | 7/2006 | Burroughs | |
| 7,079,012 B2 | 7/2006 | Wetmore | |
| 7,079,647 B2 | 7/2006 | Tomobe | |
| 7,081,827 B2 | 7/2006 | Addy | |
| 7,089,126 B2 | 8/2006 | Muir | |
| 7,091,849 B1 | 8/2006 | Henry | |
| 7,095,848 B1 | 8/2006 | Fischer et al. | |
| 7,098,773 B2 | 8/2006 | Berkman | |
| 7,099,707 B2 | 8/2006 | Amin et al. | |
| 7,106,261 B2 | 9/2006 | Nagel et al. | |
| 7,113,574 B1 | 9/2006 | Haas et al. | |
| 7,117,272 B2 | 10/2006 | Rimboim et al. | |
| 7,133,278 B2 | 11/2006 | Amdahl et al. | |
| 7,135,982 B2 | 11/2006 | Lee | |
| 7,136,270 B2 | 11/2006 | Liebenow | |
| 7,136,936 B2 | 11/2006 | Chan et al. | |
| 7,142,094 B1 | 11/2006 | Davidow et al. | |
| 7,143,299 B1 | 11/2006 | Rubinstein et al. | |
| 7,145,439 B2 | 12/2006 | Darshan et al. | |
| 7,148,799 B2 | 12/2006 | Cern et al. | |
| 7,152,168 B2 | 12/2006 | Boynton et al. | |
| 7,154,381 B2 | 12/2006 | Lang et al. | |
| 7,155,214 B2 | 12/2006 | Struthers et al. | |
| 7,155,622 B2 | 12/2006 | Mancey et al. | |
| 7,162,234 B1 | 1/2007 | Smith | |
| 7,162,377 B2 | 1/2007 | Amrod et al. | |
| 7,162,650 B2 | 1/2007 | Ke et al. | |
| 7,164,346 B2 | 1/2007 | Hunt et al. | |
| 7,167,078 B2 | 1/2007 | Pourchot | |
| 7,170,194 B2 | 1/2007 | Korcharz et al. | |
| 7,170,405 B2 | 1/2007 | Daum et al. | |
| 7,171,506 B2 | 1/2007 | Iwamura | |
| 7,176,786 B2 | 2/2007 | Kline et al. | |
| 7,180,412 B2 | 2/2007 | Bonicatto et al. | |
| 7,181,023 B1 | 2/2007 | Andrews et al. | |
| 7,183,902 B2 | 2/2007 | Hamburgen et al. | |
| 7,187,695 B2 | 3/2007 | Binder | |
| 7,193,149 B2 | 3/2007 | Polanek et al. | |
| 7,194,528 B1 | 3/2007 | Davidow | |
| 7,194,639 B2 | 3/2007 | Atkinson et al. | |
| 7,198,521 B2 | 4/2007 | Hauck et al. | |
| 7,199,699 B1 | 4/2007 | Gidge | |
| 7,199,706 B2 | 4/2007 | Dawson et al. | |
| 7,203,849 B2 | 4/2007 | Dove | |
| 7,203,851 B1 | 4/2007 | Lo et al. | |
| 7,206,417 B2 | 4/2007 | Nathan | |
| 7,207,846 B2 | 4/2007 | Caveney et al. | |
| 7,209,719 B2 | 4/2007 | Liebenow | |
| 7,221,261 B1 | 5/2007 | Klingensmith et al. | |
| 7,224,272 B2 | 5/2007 | White, II et al. | |
| 7,225,345 B2 | 5/2007 | Korcharz et al. | |
| 7,231,535 B2 | 6/2007 | Le Creff et al. | |
| 7,240,224 B1 | 7/2007 | Biederman | |
| 7,242,729 B1 | 7/2007 | Heistermann et al. | |
| 7,245,625 B2 | 7/2007 | Manis et al. | |
| 7,247,793 B2 | 7/2007 | Hinkson et al. | |
| 7,254,734 B2 | 8/2007 | Lehr et al. | |
| 7,256,684 B1 | 8/2007 | Cafiero et al. | |
| 7,257,108 B2 | 8/2007 | Cheston et al. | |
| 7,265,664 B2 | 9/2007 | Berkman | |
| 7,266,344 B2 | 9/2007 | Rodriguez | |
| 7,272,669 B2 | 9/2007 | Mattur et al. | |
| 7,276,915 B1 | 10/2007 | Euler et al. | |
| 7,280,032 B2 | 10/2007 | Aekins et al. | |
| 7,281,141 B2 | 10/2007 | Elkayam et al. | |
| 7,292,859 B2 | 11/2007 | Park | |
| 7,299,287 B1 | 11/2007 | Rubinstein et al. | |
| 7,299,368 B2 | 11/2007 | Peker et al. | |
| 7,307,510 B2 | 12/2007 | Berkman | |
| 7,310,355 B1 | 12/2007 | Krein et al. | |
| 7,316,586 B2 | 1/2008 | Anderson et al. | |
| 7,319,717 B2 | 1/2008 | Zitting | |
| 7,323,968 B2 | 1/2008 | Iwamura | |
| 7,324,824 B2 | 1/2008 | Smith et al. | |
| 7,330,695 B2 | 2/2008 | Karschnia et al. | |
| 7,331,819 B2 | 2/2008 | Nelson | |
| 7,339,458 B2 | 3/2008 | Cern | |
| 7,340,509 B2 | 3/2008 | Daum et al. | |
| 7,343,506 B1 | 3/2008 | Fenwick | |
| 7,345,998 B2 | 3/2008 | Cregg et al. | |
| 7,349,325 B2 | 3/2008 | Trzeciak et al. | |
| 7,353,407 B2 | 4/2008 | Diab et al. | |
| 7,356,588 B2 | 4/2008 | Stineman, Jr. et al. | |
| 7,363,525 B2 | 4/2008 | Biederman et al. | |
| 7,368,798 B2 | 5/2008 | Camagna et al. | |
| 7,373,528 B2 | 5/2008 | Schindler | |
| 7,375,445 B1 | 5/2008 | Smith | |
| 7,376,734 B2 | 5/2008 | Caveney | |
| 7,380,044 B1 | 5/2008 | Liburdi | |
| 7,401,239 B2 | 7/2008 | Chan et al. | |
| 7,404,091 B1 | 7/2008 | Gere | |

| | | |
|---|---|---|
| 7,404,094 B2 | 7/2008 | Lee et al. |
| 7,406,094 B2 | 7/2008 | Propp et al. |
| 7,406,536 B2 | 7/2008 | Efrati et al. |
| 7,406,614 B2 | 7/2008 | Peleg et al. |
| 7,408,949 B2 | 8/2008 | Baum |
| 7,413,471 B2 | 8/2008 | Chan |
| 7,424,031 B2 * | 9/2008 | Binder .................. 370/463 |
| 7,483,524 B2 | 1/2009 | Binder |
| 7,633,966 B2 | 12/2009 | Binder |
| 7,636,373 B2 | 12/2009 | Binder |
| 2001/0011314 A1 | 8/2001 | Gallagher et al. |
| 2001/0038635 A1 | 11/2001 | Rogers |
| 2001/0039660 A1 | 11/2001 | Vasilevsky et al. |
| 2002/0011923 A1 | 1/2002 | Cunningham et al. |
| 2002/0015489 A1 | 2/2002 | Ben-David |
| 2002/0021465 A1 | 2/2002 | Moore et al. |
| 2002/0024424 A1 | 2/2002 | Burns et al. |
| 2002/0031114 A1 | 3/2002 | Terry et al. |
| 2002/0039388 A1 | 4/2002 | Smart et al. |
| 2002/0056116 A1 | 5/2002 | Smith |
| 2002/0057581 A1 | 5/2002 | Nadav |
| 2002/0059634 A1 | 5/2002 | Terry et al. |
| 2002/0063584 A1 | 5/2002 | Molenda et al. |
| 2002/0064039 A1 | 5/2002 | Clodfelter |
| 2002/0069417 A1 | 6/2002 | Kliger et al. |
| 2002/0076038 A1 | 6/2002 | Barrese et al. |
| 2002/0080010 A1 | 6/2002 | Zhang |
| 2002/0097821 A1 | 7/2002 | Hebron et al. |
| 2002/0104009 A1 | 8/2002 | Zodnik |
| 2002/0110236 A1 | 8/2002 | Karnad |
| 2002/0116720 A1 | 8/2002 | Terry et al. |
| 2002/0144159 A1 | 10/2002 | Wu et al. |
| 2002/0145509 A1 | 10/2002 | Karny et al. |
| 2002/0150155 A1 | 10/2002 | Florentin et al. |
| 2002/0159402 A1 | 10/2002 | Binder |
| 2002/0159512 A1 | 10/2002 | Matsumoto |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0180592 A1 | 12/2002 | Gromov |
| 2002/0188762 A1 | 12/2002 | Tomassetti et al. |
| 2002/0194383 A1 | 12/2002 | Cohen et al. |
| 2002/0194605 A1 | 12/2002 | Cohen et al. |
| 2003/0006881 A1 | 1/2003 | Reyes |
| 2003/0035556 A1 | 2/2003 | Curtis et al. |
| 2003/0046377 A1 | 3/2003 | Daum et al. |
| 2003/0061522 A1 | 3/2003 | Ke et al. |
| 2003/0062990 A1 | 4/2003 | Schaeffer et al. |
| 2003/0066082 A1 | 4/2003 | Kliger et al. |
| 2003/0088706 A1 | 5/2003 | Chan et al. |
| 2003/0090368 A1 | 5/2003 | Ide et al. |
| 2003/0099228 A1 | 5/2003 | Alcock |
| 2003/0103521 A1 | 6/2003 | Raphaeli et al. |
| 2003/0107269 A1 | 6/2003 | Jetzt |
| 2003/0112965 A1 | 6/2003 | McNamara et al. |
| 2003/0133473 A1 | 7/2003 | Manis et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0206623 A1 | 11/2003 | Deichstetter et al. |
| 2003/0207697 A1 | 11/2003 | Shpak |
| 2004/0006484 A1 | 1/2004 | Manis et al. |
| 2004/0013098 A1 | 1/2004 | Tseng et al. |
| 2004/0037317 A1 | 2/2004 | Zalitzky et al. |
| 2004/0073597 A1 | 4/2004 | Caveney |
| 2004/0090984 A1 | 5/2004 | Saint-Hilaire et al. |
| 2004/0105539 A1 | 6/2004 | Auzizeau et al. |
| 2004/0107445 A1 | 6/2004 | Amit |
| 2004/0121648 A1 | 6/2004 | Voros |
| 2004/0130413 A1 | 7/2004 | Mentz et al. |
| 2004/0136373 A1 | 7/2004 | Bareis |
| 2004/0136384 A1 | 7/2004 | Cho |
| 2004/0136388 A1 | 7/2004 | Schaff |
| 2004/0146061 A1 | 7/2004 | Bisceglia et al. |
| 2004/0147232 A1 | 7/2004 | Zodnik |
| 2004/0156513 A1 | 8/2004 | Kaylor et al. |
| 2004/0164619 A1 | 8/2004 | Parker et al. |
| 2004/0177167 A1 | 9/2004 | Iwamura et al. |
| 2004/0178888 A1 | 9/2004 | Hales et al. |
| 2004/0180573 A1 | 9/2004 | Chen |
| 2004/0198236 A1 | 10/2004 | Paine et al. |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0268160 A1 | 12/2004 | Atkinson et al. |
| 2005/0015805 A1 | 1/2005 | Iwamura |
| 2005/0018766 A1 | 1/2005 | Iwamura |
| 2005/0047379 A1 | 3/2005 | Boyden et al. |
| 2005/0053087 A1 | 3/2005 | Pulyk |
| 2005/0063108 A1 | 3/2005 | Voll et al. |
| 2005/0073968 A1 | 4/2005 | Perlman |
| 2005/0076148 A1 | 4/2005 | Chan |
| 2005/0078700 A1 | 4/2005 | Thompson et al. |
| 2005/0086389 A1 | 4/2005 | Chang |
| 2005/0097369 A1 | 5/2005 | Bowser et al. |
| 2005/0125083 A1 | 6/2005 | Kiko |
| 2005/0125507 A1 | 6/2005 | Atias et al. |
| 2005/0136972 A1 | 6/2005 | Smith et al. |
| 2005/0136989 A1 | 6/2005 | Dove |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0201306 A1 | 9/2005 | Engel |
| 2005/0226200 A1 | 10/2005 | Askildsen et al. |
| 2005/0239400 A1 | 10/2005 | Narikawa |
| 2005/0245127 A1 | 11/2005 | Nordin et al. |
| 2005/0268120 A1 | 12/2005 | Schindler et al. |
| 2005/0268322 A1 | 12/2005 | Watson |
| 2005/0280598 A1 | 12/2005 | Webb et al. |
| 2005/0281326 A1 | 12/2005 | Yu |
| 2006/0007945 A1 | 1/2006 | Schoettle et al. |
| 2006/0017324 A1 | 1/2006 | Pace et al. |
| 2006/0053324 A1 | 3/2006 | Giat et al. |
| 2006/0056444 A1 | 3/2006 | Binder |
| 2006/0089230 A1 | 4/2006 | Biederman et al. |
| 2006/0140260 A1 | 6/2006 | Wasaki et al. |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0197387 A1 | 9/2006 | Hung et al. |
| 2006/0215680 A1 | 9/2006 | Camagna |
| 2006/0222086 A1 | 10/2006 | Frye |
| 2006/0238250 A1 | 10/2006 | Camagna et al. |
| 2006/0251179 A1 | 11/2006 | Ghoshal |
| 2006/0262727 A1 | 11/2006 | Caveney |
| 2006/0269001 A1 | 11/2006 | Dawson et al. |
| 2007/0025368 A1 | 2/2007 | Ha et al. |
| 2007/0036171 A1 | 2/2007 | Magin |
| 2007/0041577 A1 | 2/2007 | Ghoshal et al. |
| 2007/0058666 A1 | 3/2007 | Pratt |
| 2007/0082649 A1 | 4/2007 | Chan |
| 2007/0083668 A1 | 4/2007 | Kelsey et al. |
| 2007/0112939 A1 | 5/2007 | Wilson et al. |
| 2007/0167144 A1 | 7/2007 | Koga et al. |
| 2007/0198748 A1 | 8/2007 | Ametsitsi et al. |
| 2007/0206629 A1 | 9/2007 | Choi |
| 2007/0206749 A1 | 9/2007 | Pincu et al. |
| 2007/0208961 A1 | 9/2007 | Ghoshal et al. |
| 2007/0213879 A1 | 9/2007 | Iwamura |
| 2007/0220618 A1 | 9/2007 | Holmes et al. |
| 2007/0236853 A1 | 10/2007 | Crawley |
| 2007/0254714 A1 | 11/2007 | Martich et al. |
| 2007/0260904 A1 | 11/2007 | Camagna et al. |

| | | | |
|---|---|---|---|
| 2008/0013612 | A1 | 1/2008 | Miller et al. |
| 2008/0013637 | A1 | 1/2008 | Kodama et al. |
| 2008/0058018 | A1 | 3/2008 | Scheinert |
| 2008/0125187 | A1 | 5/2008 | Chang et al. |
| 2008/0136915 | A1 | 6/2008 | Iwamura |
| 2008/0140565 | A1 | 6/2008 | DeBenedetti et al. |
| 2008/0153415 | A1 | 6/2008 | Block et al. |
| 2008/0165463 | A1 | 7/2008 | Chan |
| 2008/0186150 | A1 | 8/2008 | Kao |

FOREIGN PATENT DOCUMENTS

| | | |
|---|---|---|
| EP | 0241152 | 10/1987 |
| EP | 0355532 | 2/1990 |
| EP | 1343253 | 9/2003 |
| GB | 2368979 | 5/2002 |
| JP | 56-87192 | 7/1981 |
| JP | 57-204655 | 12/1982 |
| JP | 58-206257 | 12/1983 |
| JP | 7-336379 | 12/1995 |
| JP | 09-84146 | 3/1997 |
| WO | 9623377 A1 | 8/1996 |
| WO | WO 96/23377 | 8/1996 |
| WO | WO 97/50193 | 12/1997 |
| WO | WO 98/02985 | 1/1998 |
| WO | WO 99/53627 | 10/1999 |
| WO | WO 01/43238 | 6/2001 |
| WO | WO 02/091652 | 11/2002 |
| WO | WO 02/102019 | 12/2002 |
| WO | WO2007069241 | 6/2007 |

OTHER PUBLICATIONS

'High-Speed Networking with LAN Switches', by Gilbert Held, 1997, ISBN: 0-471-18444-6 (281 pages).
'Interconnections Bridges and Routers', by Radia Perlman, 1992, ISBN: 0-201-56332-0 (393 pages).
'Macworld Networking Bible', Second Edition pp. 1-331, by Dave Kosiur and Joel M. Snyder, 1994, ISBN: 1-56884-194-9 (354 pages).
'Macworld Networking Bible', Second Edition pp. 332-688, by Dave Kosiur and Joel M. Snyder, 1994, ISBN: 1-56884-194-9 (363 pages).
'High-Speed Cable Modems', pp. 1-246 by Albert A. Azzam, 1997, ISBN: 0-07-006417-2 (276 pages).
'High-Speed Cable Modems', pp. 247-570 by Albert A. Azzam, 1997, ISBN: 0-07-006417-2 (321 pages).
Cisco's 2600 Series Routers, "Quick Start Guide: Cisco 2610 Router, Cabling and Setup," published in 1998.
NBX Corporation's NBX 100,"Network Based Exchange: The Complete Communications Solution," published in 1997.
Kevin Fogarty, "ZAP! NetWare users get really wired—over electric power lines," Network World , Jul. 3, 1995.
Abraham, K.C. et al; A Novel High-Speed PLC Communication Modem; IEEE Transaction on Power Delivery, vol. 7, No. 4, Oct. 1992, 8 pages.
Abrahams, Richard, "Socket to me: networks linked by electrical lines"; Mass High Tech, 1997, one page.
Bak, David; "LAN Operates Over Existing Power Lines"; Design News, Jan. 23, 1989, 3 pages.
Broadbridge, R.; "Power Line Modems and Networks"; Second IEE National Conference on Telecommunications, Apr. 2-5, 1989; pp. 294-296, 6 pages.
Detreville, John et al; "A Distributed Experimental Communications System"; IEEE Journal on Selected Areas in Communications, vol. Sac-1, No. 6, pp. 1070-1075, Dec. 1983, 6 pages.
Dostert, Klaus; "Telecommunications Over the Power Distribution Grid—Possibilities and Limitations"; Proceedings, 1997 Int'l Symposium on Power-Line communications and its Applications, Apr. 2-4, 1997, 10 pages.
Gershon, Ron et al; "A Token Passing Network for Powerline Communications" by Adaptive Networks, IEEE Transactions on Consumer Electronics, vol. 37, No. 2, 1991, 6 pages.
Goodenough, Frank; Chip Set Puts 100 Kbit/s of Data on Noisy Power Lines; Electronic Design, Mar. 18, 1996, 9 pages.

Hachman, Mark; Compaq to Ride the CEBu5; EBN, Jan. 22, 1996, one page.
Herbold, Jacob et al; "Banish Those 'Wall-Warts' with power over Ethernet"; Electronic Design, Oct. 27, 2003, 8 pages.
Hoffman, J.; "Cable, Television, and the Consumer Electronic Bus"; Panasonic Technologies, Inc., pp. 165-173.
Johnson, Johna Till; "Videohub Cuts Costs, Opens Options"; Data Communications, Feb. 1992; 4 pages.
Markwalter, Brian at al; CEBUs Router Testing; IEEE Transactions on Consumer Electronics, Nov. 1991, vol. 37, No. 4, 8 pages.
Metcalfe, Bob; "Cheap, Reliable Powerful 'Net Connections May Be as Close as an Electrical Socket"; InfoWorld, Feb. 10, 1997, vol. 19, issue 6 (4 pages).
Propp, Michael, Dr.; "The Use of Reliable Communications in Telemanagement Trials"; Proceedings, 1997, International Symposium on Power-Line Communications and its Applications, $2^{nd}$ Ed., 9 pages.
Radford, Denny; "Spread-spectrum Data Leap Through AC Power Wiring"; IEEE Spectrum, Nov. 1996. pp. 48-53.
Sheets, William et al "Carrier Current Audio Transmitter"; Radio Electronics, Jan. 1989, 5 pages.
Sheets, William et al "Carrier Current Receiver"; Radio Electronics, Feb. 1989, vol. 60, No. 2), 6 pages.
Strassberg, Dan; Home Automation Buses: Protocols Really Hit Home; EDN Design Feature, Apr. 13, 1995, 9 pages.
Trowbridge, Dave; "High Cost of Wiring Sparks Wireless LAN Alternatives"; Computer Technology Review, vol. XIV, No. 3, Mar. 1994, 8 pages.
Vun, Nicholas, et al; "A Power LAN for Telecommunication Power Supply Equipment; IEEE Region 10 Conference on "Computer, Communication, Control and Power Engineering, 1993, pp. 24-27, vol. 3 of 5.
Wildstrom, Stephen; "Now This is Plug and Play"; Business Week, Updated Jun. 14, 1997, 2 pages.
Communications System Uses Standard Powerlines; Computer Design, Nov. 1995 (3 pages).
Intelogis Simplifies Networking (Passport Plug-In Network); Jul. 20, 1998, 1 page.
"Spread Spectrum Carrier Technology Enabling Reliable Communications Over Noisy Media"; !Intellon, 8 pages.
LTS-10 SLTA Core Module Model 65200; Echelon, 1993, 12 pages.
"Powerline Network Communications Module"; Adaptive Networks Printed 11-88 (2 pages).
"Data Transmission Without Wires"; Material Handling Engineering, 1993, 1 page.
Powerhouse Wireless Remote Controls; http://web.archive.org/web/19970209054822.x10remo.htm. 3 pages.
Powerhouse Wireless Wall Switches; http://web.arcbive.org/web/19970209054911/x10.com/x10wws.htm. 3 pages.
RCA Wireless Phone Jack for DirecTV from Amazon.com website. 5 pages.
Echelon Customer Support Alert Re: RTR-10 Core Module and RTR-10 Motherboard Changes, Jan. 1996, 2 pages.
NE5050 Power line modem product specification; Philips semiconductors, Apr. 15, 1992, 6 pages.
Sheets and Graf, "Build This Carrier Current Audio Transmitter", Radio Electronics, pp. 55-64, 1989.
Sheets and Graf, "Build This Carrier Current Receiver", Radio Electronics, pp. 54-94, 1989.
M. Inoue, et al, "The MELON Home Automation Housekeeping System", Mitsubishi Denki Giho, vol. 63, No. 2, 1989, pp. 36-41.
C. Dougligeris, et al., "Communications and Control for a Home Automation System", Conference: IEEE Proceedings of the Southeastcon 1991, vol. 1, pp. 171-175.
D.G.J. Fanshawe, "Architures for Home Systems," Conference: IEEE Colloquium on Home Systems—Information, Entertainment and Control, Oct. 1, 1990, London, United Kingdom, pp. 3/1-3/3.
"CEBus: US Households Are Being Networked," Funkschau, No. 9, Apr. 1989, pp. 45-47.
Hoe-Young Noh, "Home Automation," Korea Information Science Society Review, Apr. 1989, vol. 7 No. 2, pp. 40-44, Republic of Korea. (Translation Provided).

"White Paper on Medium Voltage Powerline Communication (PLC) Networks", CIGRE SC D2 WG 14, Broadband PLC, (Mar. 2005), pp. 1-58.

"White Paper on Medium Voltage Powerline Communication (PLC) Networks Annexes", CIGRE SC D2 WG 14, Broadband PLC, Apr. 2005), 1-15.

Patent Abstracts of Japan, Japanese Publication No. 10200544 A2, Published Jul. 31, 1998, (Matsushita Electric Works, LTD).

Tohoku Electric Power, Co., Inc., "Tohoku Electric Develops High-Speed Communications System Using Power Distribution Lines," Tohoku Currents, Spring 1998, 8(1), 2 pages (http://www.tohoku-epco.co.jp/profil/kurozu/c.sub.-Vol 8.sub.—1 /art04.ht- m).

Power Line Communications Conference Entitled, "PLC, A New Competitor in Broadband Internet Access," Dec. 11-12, 2001, Washington, D.C., 60 pages.

Rivkin, S. R., "Co-Evolution of Electric & Telecommunications Networks", The Electricity Journal, May 1998, pp. 71-76.

Marketing Assessment Presentation Entitled "Powerline Telecommunications", The Shpigler Group for CITI PLT, Jul. 16, 2002, 9 pages.

C. Campbell, Presentation Entitled "Building a Business Case for PLC: Lessons Learned From the Communication Industry Trenches", KPMG Consulting, Jul. 16, 2002, 5 pages.

"Embedded Power Line Carrier Modem," Archnet Electronic Technology, http://www.archnetco.com/english/product/ATL90.htm, .COPYRGT. 2001, 3 pages.

"Archnet: Automatic Meter Reading System Power Line Carrier Communication", www.archnetco.com/english/product/product.sub.--sl.htm, .COPYRGT. 2001, 3 pages.

"Power Line Communications Solutions", www.echclon.comfproducts/oem/transceiverslpowerline/dcfault.htm,. COPYRGT. 2002, 2 pages.

"Texas Instruments: System Block Diagrams; Power Line Communication (Generic)", http://focus.ti.com/docs/apps/catalogfresources/blockdiagram.jhtml?bdld=6- 38, COPYRGT. 1995-2002. 1 page.

Na. Feduschak, "Waiting in the Wings: Is Powerline Technology Ready to Compete with Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz-Part 4: Filters at the Interface of the Indoor and Outdoor Electricity Network", CLC SC 105A (Secretariat) May 1992, 62, pp. 1-11.

"Intellon Corporation Test Summary for Transformerless Coupler Study", Intellon No News Wires, Dec. 24, 1998, DOTINHTSA Order No. DTNH22-98-P-07632, pp. 1-18.

EMETCON Automated Distribution System, ABB Power T & D Company, Inc., Jan. 1990, Raleigh, North Carolina, No. B-919A, 14 pages.

"Dedicated Passive Backbone for Power Line Communications", IBM Technical Disclosure Bulletin, Jul. 1997, 40 (7), pp. 183-185.

"Centralized Commercial Building Applications with the Lonworks .RTM. PLT-21 Power Line Transceiver", Lonworks Engineering Bulletin, Echelon, Apr. 1997, pp. 1-22.

Plexeon Logistics, Inc., "Power Line Communications", www.plexeon.com/power.html, .COPYRGT. 1998-2003, 2 pages.

"EMETCON Automated Distribution System: Communications Guide", Westinghouse ABB Power T & D Company Technical Manual 42-6001A, Sep. 1989, 55 pages.

K.C. Abraham, et al., "A Novel High-Speed PLC Communication Modem", IEEE Transactions on Power Delivery, 1992,7(4),pp. 1760-1768.

J.M. Barstow, "A Carrier Telephone System or Rural Service", AIEE Transactions, 1947, 66, 301-307.

S.S.L. Chang, "Power-Line Carrier", Fundamentals Handbook of Electrical and Computer Engineering, vol. II-Communication, Control, Devices and Systems, John Wiley & Sons, New York, 1983, pp. 617-627.

Y.F. Chen, et al. "Baseband Transceiver Design of a 128-Kbps Power-Line Modem for Household Applications", IEEE Transactions on Power Delivery, 2002, 17 (2), pp. 338-344.

N.G. Coakley, et al., "Real-Time Control of a Servosystem Using the Inverter-Fed Power Lines to Communicate Sensor Feedback", IEEE Transactions on Industrial Electronics, 1999, 46 (2) 360-369.

T. Esmailian, et al., "A Discrete Multitone Power Line Communication System", Department of Electrical and Computer Engineering, University of Toronto, Ontario Canada, 2000 IEEE, pp. 2953-2956.

Kawamura, A. et al., "Autonomous Decentralized Manufacturing System Using High-speed Network with Inductive Transmission of Data and Power", IEEE, 1996, pp. 940-945.

Kilbourne, B. "EEI Eectric Perspectives: The Final Connection", www.eei.org/ep/editorial/Jul-01/0701conenct,htm, Jul./Aug. 2001,7 pages.

W.O. Kim, et al., "A Control Network Architecture Based on EIA-709.1 Protocol for Power Line Data Communications", IEEE Transactions on Consumer Electronics, 2002, 48 (3), pp. 650-655.

C.K. Lim, et al., "Development of a Test Bed for High-Speed Power Line Communications", School of Electrical and Electronic Engineering, Nanyang Technological University, Singapore, IEEE, 2000, pp. 451-456.

G. Lokken, et al., "The Proposed Wisconsin Electric Power Company Load Management System Using Power Line Carrier Over Distribution Lines", 1976 National Telecommunications Conference, IEEE, 1976, 2.2-12.2-3.

E. Marthe, et al., "Indoor Radiated Emission Associated with Power Line Communication Systems", Swiss Federal Institute of Technology Power Systems Laboratory IEEE, 2001, pp. 517-520.

Naredo, J.L. et. Al., "Design of Power Line Carrier Systems on Multitransposed Delta Transmission Lines", IEEE Transactions on Power Delivery, 1991, 6(3), pp. 952-958.

H. Okazaki, et al., "A Transmitting, and Receiving Method for CDMA Communications Over Indoor Electrical Power Lines", IEEE, 1998, pp. VI-522-VI-528.

B. Don Russell, "Communication Alternatives for Distribution Metering and Load Management," IEEE Transactions on Power Apparatus and Systems, 1980, vol. PAS-99 (4), pp. 1448-1455.

W.N. Sado, et al., "Personal Communication on Residential Power Lines-Assessment of Channel Parameters", Nov. 6-10, 1995, IEEE, pp. 532-537.

Lonworks Engineering Bulletin, "Demand Side Management with Lonworks.RTM, Power Line Transceivers", Dec. 1996, 36 pages.

HomePlug.TM.Powerline Alliance, HomePlug Initial Draft Medium Interface Specification, May 19, 2000, 109 pages.

HomePlug.TM.Powerline Alliance, HomePlug 0.5 Draft Medium Interface Specification, Nov. 28, 2000, 133 pages.

HomePlug.TM.Powerline Alliance, HomePlug Initial Draft Medium Interface Specification, Jul. 27, 2000, 109 pages.

HomePlug,TM.Powerline Alliance, HomePlug 1.01 Specification, Dec. 1, 2001, 139 pages.

Summary of an IEEE Guide for Power-Line Carrier Applications, A Report by the Power System Communications Committee, IEEE Transactions on Power Apparatus and Systems, vol. PAS-99, No. 6, Nov./Dec. 1980, pp. 2334-2337.

Communication Link on the LV Power Supplies for Utility Services: Field Tests in Belgium, Apr. 3-5, 1990, Sixth International Conference on Manchester, UK. pp. 168-172.

Tanaka, M., Transmission Characteristics of a Power Line Used for Data Communications at High Frequencies, IEEE Transactions on Consumer Electronics, Feb. 1989, vol. 35, No. 1, pp. 37-42.

E.F. Hasler, et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, .COPYRGT. 1980 by The Institute of Electrical and Electronics Engineers, Inc., pp. 1-80.

M. Hatori, et al., "Home Informatization and Standardization of Home Bus," IEEE, Transactions on Consumer Electronics, Aug. 1986, vol. CE-32, No. 3, pp. 542-549.

J. M. Hunt, et al., "Electrical Energy Monitoring and Control System for the Home," iEEE Transactions on Consumer Electronics, Aug. 1986, vol. CE-32. No. 3, pp. 578-583.

F.W. Gutzwiller, et al., "Homenet: A Control Network for Consumer Applications," IEEE Transactions on Consumer Electronics, Aug. 1983, vol. CE-29, No. 3, pp. 297-304.

P. Burrascano, et al., "Digital Signal Transmission on Power Line Carrier Channels: An Introduction," IEEE Transactions on Power Delivery, Jan. 1987, vol. PWRD-2, No. 1, pp. 50-56.
Burr, A.G. Burr, et al., "Effect of HF Broadcast Interference on PowerLine Telecommunications Above 1 MHZ". COPYRGT.1998 IEEE, pp. 2870-2875.
J Ontunga, et al., "Distribution Line Communications Using CSMA Access Control with Priority Acknowledgements," IEEE Transactions on Power Delivery, Apr. 1989, vol. 4, No. 2, pp. 878-886.
Tanaka, M "High Frequency Noise Power Spectrum, Impedance and Transmission Loss of Power Line in Japan on Intrabuilding Power Line Communications," IEEE Transactions on Consumer Electronics, May 1988, vol. 34, No. 2 pp. 321-326.
H. Meng et al., "A Transmission Line Model for High-Frequency Power Line Communication Channel,". COPYRGT.2002 IEEE, pp. 1290-1295.
P. Burrascano, et al., "Performance Evaluation of Digital Signal Transmission Channels on Coronating Power Lines," .COPYRGT. 1988 IEEE, pp. 365-368.
D.A. Diclementi, et al., "Electrical Distribution System Power Line Characterization," .COPYRGT.1996 IEEE, pp. 271-278.
M. Yoshitoshi et al., "Proposed Interface Specifications for Home Bus," IEEE Transactions on Consumer Electronics Aug. 1986 vol. CE-32 No. 3 pp. 550-557.
J.B. Oneal, Jr., "The Residential Power Circuit as a Communication Medium," IEEE Transactions on Consumer Electronics, Aug. 1986, vol. CE-32, No. 3, pp. 567-577.
K. Dostert, "EMC Aspects of High Speed Powerline Communications," Proceedings of the 15.sup.th International Wroclaw Symposium and Exhibition on Electromagnetic Capability, Jun. 27-30, 2000; Wroclaw, Poland, pp. 98-102.
R.A. Piety, "Intrabuilding Data Transmission Using Power-Line Wiring," Hewlett-Packard Journal, May 1987, pp. 35-40.
K. Dostert, Powerline Communications, Ch. 5, pp. 286, 288-292, Prentice Hall PTR, Upper Saddle River, NJ. COPYRGT.2001.
E. Liu, et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.
LonWorks LPI-10 Link Power Interface Module User's Guide; Echelon Corporation, 1995 (37 pages).
LonWorks LPT-10 Link Power Transceiver User's Guide Version 2.1; Echelon Corporation, 1995 (60 pages).
LonWorks Router User's Guide Revision 3; Echelon Corporation, 1995 (68 pages).
Using the LonWorks PLT-22 Power Line Transceiver in European Utility Application, Version 1; Echelon Corporation, 1996-1999 (118 pages).
PL3120 / PL3150 Power Line Smart Transceiver Data Book, Version 2; Echelon Corporation, 1996-2005 (251 pages).
PL DSK 2A Power Line Smart Transceiver Development Support Kit User's Guide; Echelon Corporation, 2005-2006 (18 pages).
Introduction to Pyxos FT Platform; Echelon Corporation, 2007 (34 pages).
LTM-IOA User's Guide, Revision 4; Echelon Corporation, 1995-2001 (46 pages).
LonWorks Twisted Pair Control Module, User's Guide Version 2; Echelon Corporation, 1992-1996 (50 pages).
AN1000EVK Evaluation Unit Manual, Draft 1.0; Adaptive Networks Inc, Document No. 04-3170-01-B Aug. 1996 (31 pages).
AN1000 Powerline Network Communications Chip Set, Adaptive Networks Inc., 1995 (56 pages).
From the Ether—Bob Metcalfe, 'Cheap, reliable, powerful 'net connections may be as close as an electrical socket'; by Bob Metcalfe InfoWorld Feb. 10, 1997 vol. 19 Issue 6 (4 pages).
LonWorks Custom Node Development, LonWorks Engineering Bulletin; Echelon Corporation, Jan. 1995 (16 pages).
Building a LonTalk-to-PLC Gateway, LonWorks Engineering Bulletin; Echelon Corporation, May 1994 (62 pages).
LonWorks 78kbps Self-Healing Ring Architecture, LonWorks Marketing Bulletin; Echelon Corporation, Aug. 1993 (6 pages).
Centralized Commercial Building Applications with the LonWorks PLT-21 Power Line Transceiver, LonWorks Engineering Bulletin; Echelon Corporation, Apr. 1997 (22 pages).
LonWorks for Audio Computer Control Network Applications; Echelon Corporation, Jan. 1995 (30 pages).
Demand Side Management with LonWorks Power Line Transceivers, LonWorks Engineering Bulletin; Echelon Corporation, Dec. 1996 (36 pages).
Intélogis to Present on Stage at Internet Showcase 1998; PR Newswire Jan. 28, 1998(1 page).
PassPort PC Plug In Quick Setup Guide; Intelogis P/N 30030202, date unknown (8 pages).
The CeBus Standard User's Guide, May 1996, pp. 1-317.
Edward Cooper, Broadband Network Technology-An overview for the data and communications industries, Sytek Systems, Mountain View, CA, 1984 (4 pages).
Grayson Evans, The Cebus Standard User'S Guide May 1996 (317 pages).
Technical Report TR-001 ADSL Forum System Reference Model May 1996(6 pages).
Cisco Catalyst 5000 Group Switching Ethernet Modules Data Sheets; 1996 (2 pages).
Cisco Catalyst 5000 Switching System Data Sheets; 1996 (2 pages).
Cisco Catalyst 5000 ATM LAN Emulation Module Data Sheets; 1995 (2 pages).
Cisco Catalyst 5000 Family Fast EtherChannel Switching Modules Data Sheets; 1999 (3 pages).
Motorola CableComm CyberSURFR Cable Modem Specifications; Apr. 1998 (4 pages).
3Com Product details 3COM NBX 2101PE Basic Phone discontinued undated (3 pages).
Catalyst 5000 Series; undated (12 pages).
IEEE Standard for a High Performance serial Bus; IEEE Std 1394-1995 Published 1996 (392 pages).
DSLPipe Reference Guide; by Ascend Communications, Jun. 2, 1997 (162 pages).
DSLPIpe Users Guide; by Ascend Communications, Jun. 3, 1997 (245 pages).
Ascend DSLPipe-S Features and specifications; Posted May 12, 1997 (4 pages).
CiscoPro EtherSwitch CPW2115; Dec. 95 (4 pages).
IBM LAN Bridge and Switch Summary -undated (108 pages).
HART Field Communication Protocol—An introduction for users and manufacturers' published by the HART Communication Foundation, Austin, Texas, Oct. 1995 (12 pages).
Continuation of IBM LAN Bridge and Switch Summary -undated (68 pages).
Motorola announces key new features to CyberSURFR Cable Modem System- undated (3 pages).
SuperStack II Desktop Switch; 3Com Sep. 1996 (2 pages).
Cisco Catalyst 5000; Industry's First Modular, Multilayer-Capable switching System for the Wiring Closet; Posted May 16, 1996 (22 pages).
Catalyst 5000 switching System: Cisco (4 pages).
Cisco Catalyst 5002 Switching System: (4 pages).
Canned Heat; Data Communications Feb. 1996 (10 pages).
Catalyst 5000 Series: (12 pages).
Fast Ethernet 100-Mbps Solutions; Posted Mar. 112, 1996 (10 pages).
Forget the Forklift; Data Communications Sep. 1996 (11 pages).
LAN Emulation; Posted Nov. 15, 1995 (16 pages).
IBM LAN Bridge and Switch Summary, IBM, published Jan. 1996 (70 pages).
Continuation of IBM LAN Bridge and Switch Summary, IBM, published Jan. 1996 (70 pages).
3ComImpact IQ External ISDN Modem User product brochure; Published Jun. 1996 (4 pages).
3ComImpact IQ External ISDN Modem User Guide; Published Jul. 1997 (157 pages).
Cisco Catalyst 5000 Series Configuration Worksheet, 1996 (11 pages).
Cisco Catalyst 5000 Product Announcement, Published 1996 (22 pages).

Cisco Catalyst 5000 ATM Dual PHY LAN Emulation Module; Posted Sep. 24, 1996 (4 pages).
Cisco Catalyst 5000 Group Switching Ethernet Modules; Posted May 6, 1996 (5 pages).
The Mac Reborn; Macworld Sep. 1996, p. 104-115 (16 pages).
The Mac Reborn; Macworld vol. 13, Issue 9, Sep. 1996 (9 pages).
48-Volt DC Power Supply Connection Guide; 3Com Published Mar. 2000 (12 pages).
SuperStack II PS Hub User Guide; 3Com Published Jul. 1997 (188 pages).
SuperStack II Entry Hub User Guide; 3Com Published Nov. 1996 (8 pages).
SuperStack II Baseline Switch User Guide; 3Com Published Mar. 1998 (8 pages).
SuperStack H Baseline 10/100 switch; 3Com Published Apr. 1998 (8 pages).
SuperStack II Desktop Switch User Guide; 3Com Published Jun. 1997 (148 pages).
SuperStack II Switch 610 User Guide; 3Com Published May 1999 (54 pages).
Line carrier modems—1: Build a Pair of Line-Carrier Modems (Part 1); Radio Electronics, Jul. 1988, pp. 87-91 by Keith Nichols (7 pages).
Line carrier modems -2: Build a Pair of Line-Carrier Modems (Part 2); Radio Electronics, Aug. 1988, pp. 88-96 by Keith Nichols (5 pages).
Universal Serial Bus Specification Revision 1.0; Jan. 15, 1996 (268 pages).
EIA-600.31—PL Physical Layer & Medium Specification; pp. 1-24.
EIA-600.37—Symbol Encoding Sublayer; Revision: May 12, 1995, 30 pages.
EIA-600.38—Power Line/RF Symbol Encoding Sublayer, Revision May 12, 1995; 64 pages.
IS-60.04; Node Communications Protocol Part 6: Application Layer Specification; Revision Apr. 18, 1996; 129 pages.
EIA-600.42—Node Medium Access Control Sub-layer; Revision IS-60 Feb. 22, 1996; 54 pages.
EIA-600.41 Description of the Data Link Layer; Revision Jan. 31, 1996; 60 pages.
EIA-600.10—Introduction to the CEBus Standard; Revision Feb. 5, 1995; 19 pages.
Fieldbus Standard for use in Industrial Control Systems, Part 2: Physical Layer Specification and Service Definition; ANSI/ISA-S50.02-1 992 Approved May 17, 1994; 106 pages.
NetSpeed, "SpeedRunner 202 Customer Premise ATM ADSL Router" published 1997.
Compaq Deskpro 4000S Series of Personal Computers, published in Jul. 1997.
*Serconet, Ltd.,* v. *Netgear, Inc.* Case No. CV-06-04646 PJH, Defendant's Invalidity Contentions, Jan. 29, 2007.
*Serconet, Ltd.,* v. *Netgear, Inc.* Case No. CV-06-04646 PJH, Order Construing Claims, Jul. 30, 2007.
*Serconet, Ltd.,* v. *Netgear, Inc.* Case No. CV-06-04646 PJH, Claim Comparison Chart for USP 6,480,510, Jan. 29, 2007.
*Serconet, Ltd.,* v. *Netgear, Inc.* Case No. CV-06-04646 PJH, Claim Comparison Chart for USP 7,016,368, Jan. 29, 2007.
*Serconet, Ltd.,* v. *Netgear, Inc.* Case No. CV-06-04646 PJH, Claim Comparison Chart for USP 7,035,280, Jan. 29, 2007.
Ch. Heite, R. Zapp, "Powernet—das neue EIB-Medium", XP-001080326, 114 Jg (1997) H 5, pp. 254-257.
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.

"An Interoperable Solution for FDDI Signaling Over Shielded Twisted Pair", Advanced Micro Devices Inc. , May 1, 1995.
"Ethernet Wireless LAN Systems"; BYTE, Feb. 1, 1996.
Donnan, et al, "Token Ring Access Method and Physical Layer Specifications", ANSI/IEEE Standard for 1 ocal Area Networks; ANSI/IEEE 802.5; Jan. 1, 1985.
"Superstack II Desktop Switch User Guide"; 3Com, 148 pages, Jun. 1, 1997.
"PowerDsine Product Catalogue" Israel; pp. 56-79 and 95-105; Jan. 1, 1999.
Strole, N., "The IBM Token-Ring Network—A functional Overview", IEEE Network Magazine, vol. 1, No. 1; pp. 23-30; Jan. 1, 1987.
Lavoisard, J.L., "ISDN Customer Equipments", Commutation and Transmission, No. 3; pp. 35-50; Jan. 1, 1987.
Hoffmann, J., "Cable Television and the Consumer Electronic Bus", Panasonic Technologies Inc. ; pp. 165-173; Jun. 11, 1987.
Stallings, W., "Local Networks—An Introduction"; pp. ii, xii-xvi, 373-381; Jan. 1, 1984.
Markwalter, Brian, E. et al, CEBus Router Testing, IEEE Transactions on Consumer Electronics, vol. 37, No. 4.; Nov. 1, 1991.
Gibson et al, Fibre Data Distributed Interface (FDDI)—Token Ring Physical Layer Medium Dependent (PMD); Americal National Standard for Intormation Systems; ANSI X3.166; Jan. 1, 1990.
"Claim Chart presented in request for reexamination of U.S. Patent No. 6,480,510"; Jul. 28, 1998.
"JVC Introduces Ethernet Compatible Wireless LAN System"; Business Wire; Sep. 26, 1995.
Bearfield, J.M., "Control the Power Interface of USB's Voltage Bus", Electronic Desgin, U.S. Penton Publishing, Clev. Ohio, vol. 45, No. 15; pp. 80-86; Jul. 10, 1997.
Stallings, W., "Local Networks—Third Edition"; pp. l-v, x-xvi, 499-510; Jan. 1, 1990.
"IS-60.04; Node Communications Protocol Part 6: Application Layer Specification"; Apr. 18, 1996.
Gunnerson, Gary, "Switching Hubs-Switching to the Fast Track", PC Magazine; Oct. 11, 1994.
"ITU-T 1.430 Integrated Services Digital Network—Basic User-Network Interface—Layer 1 Specification."; Jan. 1, 1996.
"Catalyst 5000 Series".
"Serconet Ltd v Netgear Inc.", Case No. CV-06-04646 PJH; Jan. 29, 2007.
Gershon, E., "FDDI on Copper with AMD PHY Components"; Advanced Micro Devices Inc.; pp. 1-7; Jan. 1, 1991.
Stallings, W., "Local Networks—Second Edition"; pp. l-v, vii-xiv, 427-434; Jan. 1, 1987.
"VISPLAN-10 Infrared Wireless LAN System"; JVC; May 1, 1996.
"The Mac Reborn"; Sep. 1, 1996.
Keller et al, "Performance Bottlenecks in Digital Movie Systems", Proceedings of the 4th International Workshop on Network and Operating System Support for Digital Audio and Video.; pp. 161-172; Jan. 1, 1993.
Willet, M., "Token-Ring Local Area Networks—An Introduction", IEEE Network Magazine, vol. 1, No. 1.; pp. 8 and 9; Jan. 1, 1987.
"Integrated Services Digital Network (ISDN)", International Telecommunicaitons Union, vol. III, Fascicle 111.8; pp. 175-176 and 204-209; Jan. 1, 1988.
RAD Data Comm. Ltd., "Token Ring Design Guide", #TR-20-01/94; chapters 1 through 4-21; Jan. 1, 1994.
*Cisco Systems, Inc.* v. *Mosaid Technology Inc.*, redacted, public version Complaint filed in the United States District Court for the District of Delaware, Aug. 16, 2010 (full version of the Complaint having been filed under seal and thus unavailable for the public).

* cited by examiner

LOCAL AREA NETWORK OF SERIAL INTELLIGENT CELLS

This is a continuation of copending application Ser. No. 11/708,545, filed on Feb. 21, 2007, itself a continuation of U.S. patent application Ser. No. 10/793,769, filed on Mar. 8, 2004, itself a division of U.S. patent application Ser. No. 10/178,223, filed Jun. 25, 2002, now U.S. Pat. No. 7,016,368, which itself is a continuation of U.S. patent application Ser. No. 09/123,486 filed Jul. 28, 1998, now U.S. Pat. No. 6,480,510, issued Nov. 12, 2002.

FIELD AND BACKGROUND OF THE INVENTION

The present invention relates to local area networks and, more particularly, to local area network topologies based on serial intelligent cells.

Bus Topology

Most prior art local area networks (LAN) use a bus topology as shown by example in FIG. 1. A communication medium 102 is based on two conductors (usually twisted pair or coaxial cable), to which data terminal equipment (DTE) units 104, 106, 108, 110, and 112 are connected, via respective network adapters 114, 116, 118, 120, and 122. A network adapter can be stand-alone or housed within the respective DTE.

This prior art bus topology suffers from the following drawbacks:

1. From the point of view of data communication, the medium can vary significantly from one installation to another, and hence proper adaptation to the medium cannot always be obtained.

2. The bus topology is not optimal for communication, and hence:
  a) the maximum length of the medium is limited;
  b) the maximum number of units which may be connected to the bus is limited;
  c) complex circuitry is involved in the transceiver in the network adapter;
  d) the data rate is limited.

3. Terminators are usually required at the ends of the medium, thus complicating the installation.

4. Only one DTE can transmit at any given time on the bus, and all other are restricted to be listeners.

5. Complex arbitration techniques are needed to determine which DTE is able to transmit on the bus.

6. In case of short circuit in the bus, the whole bus malfunctions, and it is hard to locate the short circuit.

7. Addresses should be associated independently with any network adapter, and this is difficult to attain with bus topology.

Star Topology

A number of prior art network devices and interconnections summarized below utilize star topology.

The multiplexer is a common item of equipment used in communication, both for local area networks and wide-area networks (WAN's). It is used in order to provide access to a data communications backbone, or in order to allow sharing of bandwidth between multiple stations. As shown in FIG. 2, one side of a multiplexer 202 is usually connected to a single high data rate connection 204 ("highway"), but several such connections can also be used. The other side of multiplexer 202 has multiple low data rate connections 206, 208, 210, 212, and 214. The ellipsis . . . indicates that additional connections can be made. Each low data rate connection uses part of the bandwidth offered by the high data rate connection. These low data rate connections can be of the same type or different types, and can have different or identical data rates. The multiplexing technique most commonly used is time-domain multiplexing (TDM). However, frequency-domain multiplexing (FDM) is also used.

A popular multiplexer in use is the voice multiplexer, shown in FIG. 3. A pulse-code modulation (PCM) bus 304 handling 2.048 megabits per second, containing 30 channels of 64 kilobits per second is connected to one side of a PABX/PBX 302, and up to 30 telephone interfaces 308, 312, and 316 are connected to the other side via connections 306, 310, and 314. The ellipsis . . . indicates that additional connections can be made. In this configuration, each channel in the PCM bus can be switched or be permanently dedicated to a specific telephone line. An example of such system is disclosed in U.S. Pat. No. 3,924,077 to Blakeslee.

Similarly a small private branch exchange (PABX/PBX), as shown in FIG. 4, is widely used (usually in an office or business environment) where several outside lines 403, 404, and 405 are connected to one side of a PABX/PBX 402, and multiple telephones 408, 412, and 416 are connected to the other side via lines 406, 410, and 414, respectively. The ellipsis . . . indicates that additional connections can be made. The PABX/PBX connects an outside line to a requesting or requested telephone, and allows connection between telephones in the premises.

In the configurations described above, star topology is used in order to connect to the units to the multiplexer, which functions as the network hub. The disadvantages of star topology include the following:

1. A connection between each unit and the network hub is required, and the wiring required for this connection can involve a lengthy run.

Thus, when adding new unit, an additional, possibly lengthy, connection between the new unit and the network hub must be added.

2. No fault protection is provided: Any short circuit or open circuit will disrupt service to the affected units.

3. The multiplexer can impose extensive space and power requirements.

Computer Interfaces

Various interface standards have been established in order to allow interoperability between the PC (personal computer) or workstation and its various connected elements. These standards usually relate to both mechanical and electrical interfaces, and include industry standard architecture (ISA), extended industry standard architecture (EISA), Personal Computer Memory Card Industry Association (PCMCIA), intelligent drive electronics (IDE), small computer system interface (SCSI), and others. Each added hardware unit usually utilizes a specific software driver for interoperability with the specific platform. These protocols are applicable to small distances only, and allow units to be housed within or nearby the PC or workstation enclosures. For example, equipping a PC for video capture could involve a plug-in ISA card housed within the PC on the motherboard, a video camera connected to the card, and a software driver. This configuration does not allow remote video monitoring.

Relevant Prior Art

The use of the same wire pair or pairs for both power and data communication is well known, and is widely used in telecommunications, from "Plain Old Telephone Service" ("POTS") to Integrated Services Digital Network (ISDN) and broadband services in the local-loop including other Digital Subscriber Line (xDSL) technologies. Such a concept is described, for example, in U.S. Pat. No. 4,825,349 to Marcel, describing using two pairs for such a scheme. A DC-to-DC converter for such DC feeding is described, for example, in U.S. Pat. No. 4,507,721 to Yamano et al.

The concept of power line communication (PLC) is also widely known. However, in most cases the connection is similar to a LAN environment, in which a single transmitter occupies the entire medium. Examples of such techniques include X-10 and the consumer electronics bus (CEBus, described in the EIA-600 standard). Much of this technology uses complex spread-spectrum techniques in order to accommodate problematic media (characterized by high amounts of noise and interference). Even with such improved technologies, however, the data rate obtained is relatively low.

Prior art in this field includes U.S. Pat. No. 5,684,826 to Ratner, U.S. Pat. No. 5,491,463 to Sargeant et al., U.S. Pat. No. 5,504,454 to Daggett et al., U.S. Pat. No. 5,351,272 to Abraham, U.S. Pat. No. 5,404,127 to Lee et al., U.S. Pat. No. 5,065,133 to Howard, U.S. Pat. No. 5,581,801 to Spriester et al., U.S. Pat. No. 4,772,870 to Reyes, and U.S. Pat. No. 4,782,322 to Lechner et al. Other patents can be found in U.S. Class 340/310 (sub-classes A/R and others) and International Class H04M 11/04.

The concept of using existing telephone wiring also for data communication is first disclosed in U.S. Pat. No. 5,010,399 to Goodman et al., where video signals superimposed over the telephone signals are used. However, the scheme used is of the bus type and has the drawbacks of that topology. Similarly, the idea of data transmission over a public switched telephone network (PSTN) using the higher frequency band is widely used in the xDSL systems, as is disclosed in U.S. Pat. No. 5,247,347 to Litteral et al. The patent discloses an asymmetric digital subscriber line (ADSL) system. However, only a single point-to-point transmission is described over the local-loop, and existing in-house wiring is not discussed, and thus this prior art does not disclose how to configure a full multipoint network. Multiplexing xDSL data and the POTS/ISDN data uses FDM principles, based on the fact that the POTS/ISDN services occupy the lower portion of the spectrum, allowing for the xDSL system to use the higher bandwidth.

A home bus network using dedicated wiring is disclosed in U.S. Pat. No. 4,896,349 to Kubo et al., and a home automation network based on a power line controller (PLC) is disclosed in U.S. Pat. No. 5,579,221 to Mun. U.S. Pat. No. 4,714,912 to Roberts et al. is the first to suggest communicating data over power lines not in bus topology but as 'break-and-insert'. However, only single conductor is used, and the receivers are all connected again using a bus topology.

In addition, U.S. patent application Ser. No. 08/734,921, Israel Patent Application No. 119454, and PCT Patent Application No. PCT/IL97/00195 of the present inventor disclose a distributed serial control system of line-powered modules in a network topology for sensing and control. These documents, however, do not disclose a local area network for data communications.

The prior art documents mentioned above are representative examples in the field. Certain applications are covered by more than one issued patent.

There is thus a widely recognized need for, and it would be highly advantageous to have, a means of implementing a local area network for data communications which does not suffer from the limitations inherent in the current methods. This goal is met by the present invention.

SUMMARY OF THE INVENTION

The present invention is of a local area network for data communication, sensing, and control based on serially connected modules referred to as "serial intelligent cells" (SIC's). An example of a local area network of such devices according to the present invention is illustrated in FIG. 7, to which reference is now briefly made. In this example, SIC's 700, 702, 704, 706, and 708 are connected by one or more conducting wire pairs (such as a twisted pair 710). This allows chaining, such as SIC 700 to SIC 702 to SIC 704. However, SIC 700, SIC 706, and SIC 708, located at the ends are equipped with single connection. SIC 704 is equipped with three connections, and even more connections are possible. A SIC may be interfaced to one or more DTE's, as illustrated by a DTE 714 interfaced to SIC 700 and by DTE's 716 and 718 interfaced to SIC 704. SIC's need not have an interface, however, as is illustrated by SIC 706 and SIC 702. SIC 702, though, serves as a repeater, connecting SIC 700 and SIC 704. It is to be noted that the networks according to the present invention utilize electrically-conducting media to interconnect the SIC's. Each electrically-conducting medium connects exactly two SIC's into a communicating pair of SIC's which communicate bidirectionally and independently of other communicating pairs in the local area network. Electrically-conducting media are media which transmit signals by conducting electrical current or by propagating electrical potential from one point to another. Electrically-conducting media include, but are not limited to wires, twisted pair, and coaxial cable. But electrically-conducting media do not include media such as fiber optic lines, waveguides, microwave, radio, and infrared communication media.

As noted above, SIC's in a communicating pair communicate bidirectionally. For example, SIC 704 can initiate communication (as a sender) to SIC 702 (as a receiver), but SIC 704 can just as well initiate simultaneous communication (as a sender) to SIC 700 (as a receiver). Bidirectional communication can take place simultaneously, and herein is taken to be equivalent to "full duplex" communication. In addition, as noted above, the communication between the SIC's of a communicating pair is independent of the communication between the SIC's of any other communicating pair, in that these communications neither preclude nor affect one another in any way. Furthermore, every communication between SIC's is a "point-to-point communication", which term herein denotes a communication that takes place between exactly one sender and exactly one receiver. This is in contrast to a bus-based communication, in which there are many (potential) receivers and many (potential) senders. Consequently, in the topology according to the present invention, there is automatically a termination in the physical layer at each end of a connection (a SIC), both simplifying the installation and insuring more reliable communication.

The topology according to the present invention is superior to the prior art bus topology in the following ways:

1. There is no physical limit to the number of SIC's which may be installed in the network, and hence no physical limit to the number of DTE's in the network.

2. Point-to-point communication allows higher data rates over greater distances.

3. Point-to-point communication requires less complex circuitry than bus circuitry.

4. Several SIC's can transmit and receive simultaneously. For example, SIC 700 can communicate with SIC 702 while SIC 704 communicates simultaneously with SIC 706.

5. There is no need for arbitration, allowing more efficient utilization of the network. Furthermore, priorities can be assigned to each SIC or, alternatively, to each specific message to allow the data routing to take care of priorities.

6. Addresses may be assigned by the network.

7. In the case of failure of any conductor or SIC, the network can sense the fault immediately, and the specific location of the fault (up to the specific SIC pair) is easily obtained.

Therefore, according to the present invention there is provided a local area network for data communication, sensing, and control including a plurality of serial intelligent cells interconnected exclusively by electrically-conducting media into at least one communicating pair, wherein: (a) each of the electrically-conducting media interconnects no more than two of the serial intelligent cells; (b) each of the communicating pair includes one of the electrically-conducting media and exactly two of the serial intelligent cells; (c) each of the communicating pair engages in a communication exclusively over the electrically-conducting media; and (d) each of the communicating pair engages in the communication bidirectionally and independently of the communication of any other of the communicating pair.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a local area network according to the present invention may be better understood with reference to the drawings and the accompanying description.

Figure 1:
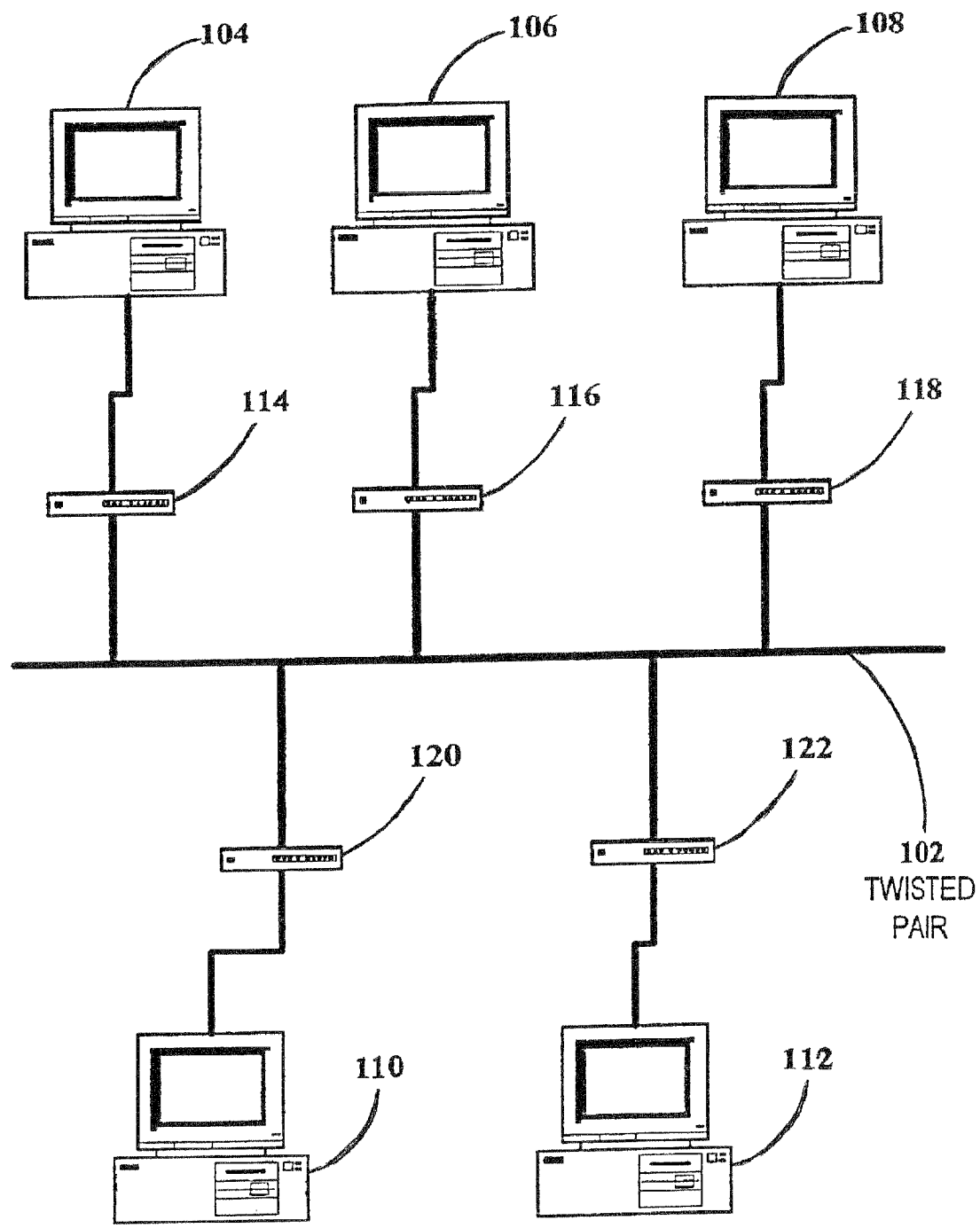
FIG. 1 shows a common prior art LAN bus topology.
Figure 2:
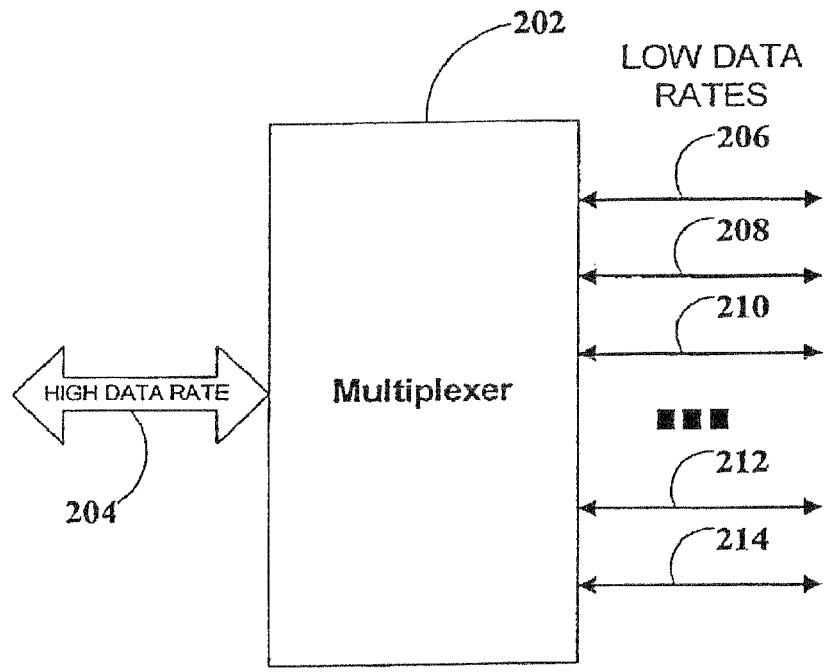
FIG. 2 shows a typical prior art multiplexer.
Figure 3:
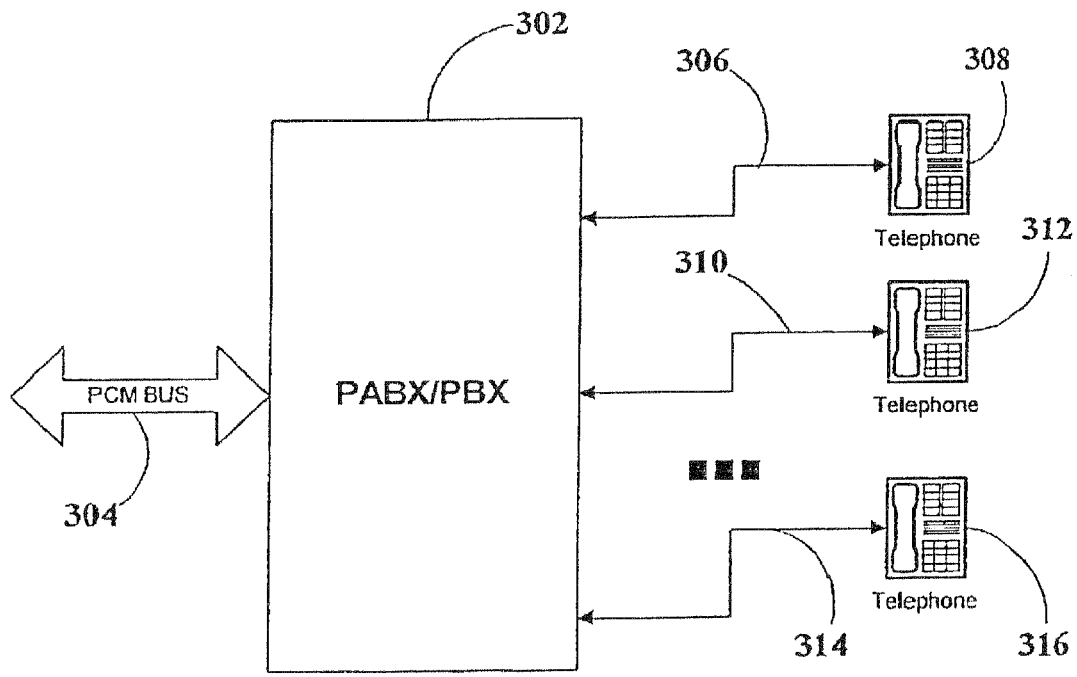
FIG. 3 shows a prior art voice multiplexer (star topology).
Figure 4:
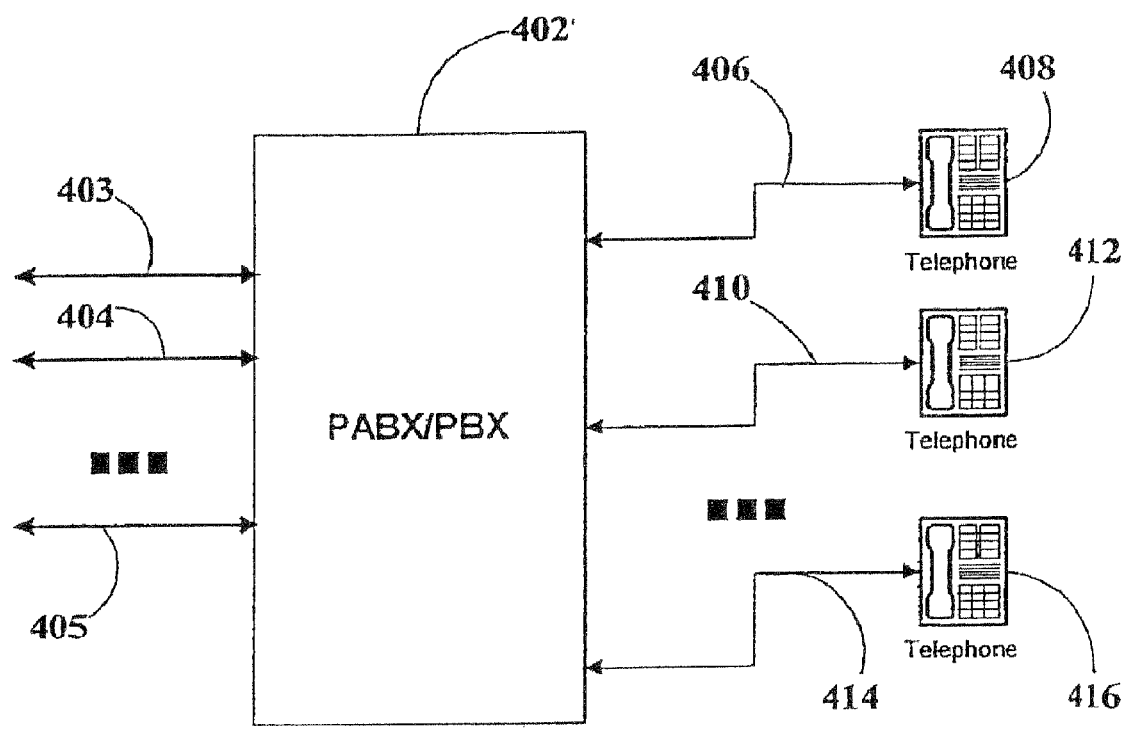
FIG. 4 shows a prior art voice exchange configuration (star topology).
Figure 5:
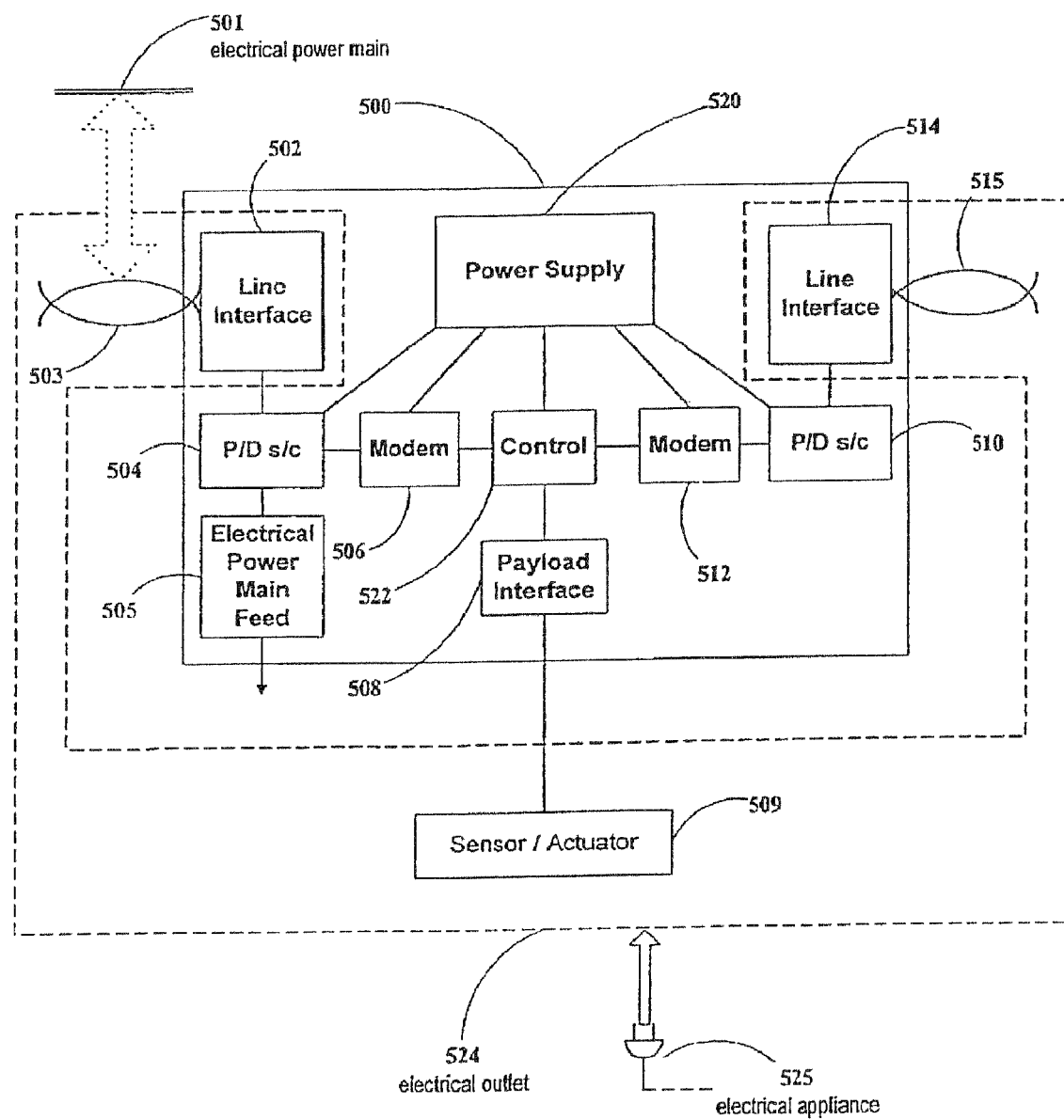
FIG. 5 is a block diagram of a SIC for control applications according to the present invention.

FIG. 5 is a block diagram of a representative SIC 500 for use in control applications. A first line interface 502 is a first port for connecting to the previous SIC to receive incoming electrical power and local area network data over electrically-conducting medium 503, which may optionally be connected to an electrical power main 501, so that SIC 500 may be powered from electrical power main 501. Line interface 502 may include the connector, fuse, lightning arrester and other protection such as noise filters, etc. The incoming power/data signal is fed to a first power/data splitter/combiner 504, which de-couples the (high frequency alternating current) data signal from the power. Such a power/data splitter/combiner 504 (denoted for brevity in FIG. 5 as "P/D s/c") can be implemented by methods well-known in the art, such as using a center-tap transformer, or alternatively with active components. The data signal is fed to a first modem 506 allowing bidirectional communication, while the power is fed to a power supply 520. The above scheme assumes that both power and data are carried by the same network wires (line-powering). FIG. 5 illustrates the case where the SIC is line-powered by alternating current (for example, by the electrical power main), in which case power/data splitter/combiner 504 is an AC power/data splitter/combiner, which separates a low-frequency alternating current power from the higher-frequency data signal. Otherwise, in the case where the SIC is line-powered by direct current, power/data splitter/combiner 504 is a DC power/data splitter/combiner, which separates direct current power from the data signal. In some cases the line-powering method is not used. For example, power can be carried by dedicated lines routed in conjunction with the data wiring. Alternatively, the SIC can be locally powered by a local power-supply. In both cases, the power/data splitter/combiner is not required, and the power lines are directly connected to the SIC power-supply, while the data connects directly to the modems. Parts of the SIC are shown optionally housed within an electrical outlet 524, such that connections to the local area network as well as to the electrical power mains may be made from electrical outlet 524. Electrical power from electrical outlet 524 can be fed to an optional electrical appliance 525. In addition, SIC 500 contains an optional electrical power main feed 505 which can also power electrical appliances or other devices.

Power-supply 520 provides the required voltages for the SIC and payload operation, and also outputs the power to a second Power/data splitter/combiner 510, for coupling to the next SIC. Communication with the next (fed) SIC is performed via a second modem 512 connected to a second line interface 514 via power/data splitter/combiner 510, similar to power/data splitter/combiner 504 as previously described. Line interface 514 feeds to electrically-conducting medium 515, which connects to the next SIC. Modems 506 and 512 can be standard RS-485, RS-232, or any simple similar data interface transceiver. Alternatively, a complex transceiver can be used for achieving long ranges or high-speed operation. CPU and firmware contained in a control block 522 control and monitor the unit operation and communication, as well as control the payload through a payload interface 508 interfacing with a payload illustrated by a sensor/actuator 509. For example, interface 508 can implement a 4-20 ma standard interface. In a similar way, SIC 500 can be used for communication over the power line. To do this, payload interface 508 is replaced by a communication port and sensor/actuator 509 will be replaced by a DTE.

Figure 6:
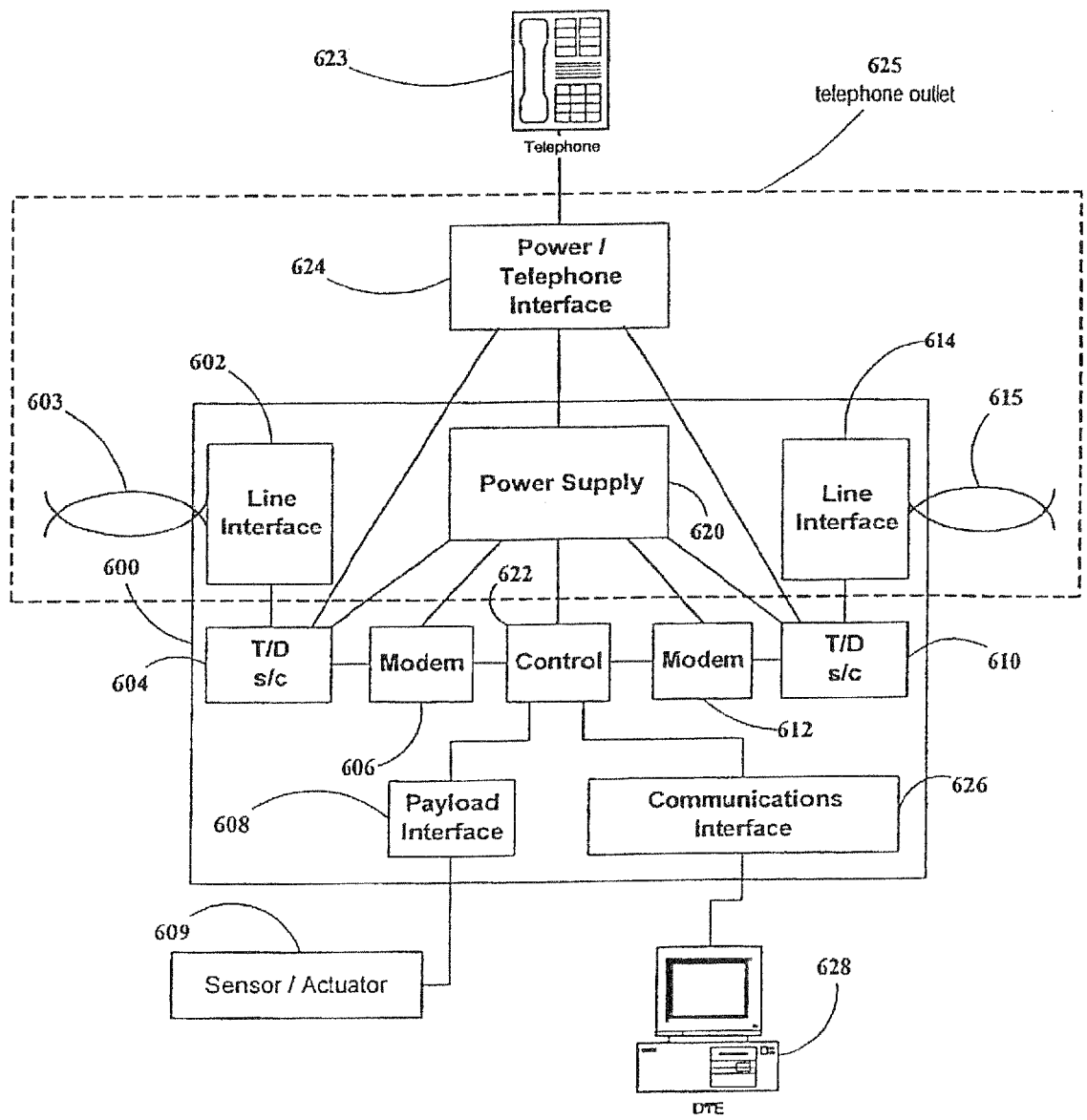
FIG. 6 is a block diagram of a SIC for data communications according to the present invention.

A SIC for use in data communications as shown in FIG. 6 is substantially similar to that used in control applications as shown in FIG. 5, but has some specific differences as noted. Also illustrated in FIG. 6 is the case where the local area network data is carried over electrically-conducting media which are part of the telephone wiring of a building. A SIC 600 has a first line interface 602 as a first port for connecting to the previous SIC to receive incoming power, local area network data, and telephony data via an electrically-conducting medium 603. Line interface 602 may include the connector, fuse, lightning arrester and other protection such as noise filters, etc. The incoming power/telephony/data signal is fed to a first telephony/data splitter/combiner 604 (denoted for brevity in FIG. 6 as "T/D s/c"), which de-couples the local area network data from the power and telephony data. Such a telephony/data splitter/combiner 604 can be implemented by methods well-known in the art, such as using a high-pass/low pass filter, or alternatively with active components. The local area network data signal is fed to a first modem 606 allowing bidirectional communication, while the power (DC) is fed to a power supply 620, and the telephony data is fed to power/telephone interface 624.

Power-supply 620 provides the required voltages for the SIC and payload operation, and also outputs the power to a second telephony/data splitter/combiner 610, for coupling to the next SIC. Communication with the next (fed) SIC is performed via a second modem 612 connected to a second line interface 614 via telephony/data splitter/combiner 610, similar to telephony/data splitter/combiner 604 as previously described. Line interface 614 connects to an electrically-conducting medium 615, which connects to the next SIC. Modems 606 and 612 can be standard RS-485, RS-232 or any simple similar data interface transceiver. Alternatively, a complex transceiver can be used for achieving long ranges or high-speed operation. CPU and firmware contained in a control block 622 control and monitor the unit operation and communication, as well as control the payload through a payload interface 608 interfacing with a payload 609, which may include sensors and actuators. For example, interface 608 can implement a 4-20 ma standard interface. SIC 600 also includes an optional power/telephone interface 624, contained for example in a telephone outlet 625, as well as one or more communications interfaces, such as a communication interface 626 connected to a DTE 628.

In the case of DC line feeding, the power supply may be equipped with a line reversal function (for example, a diode-based bridge) in order to accommodate a possible wire reversal.

Note that a SIC can be implemented as single device with all component parts contained within one enclosure, but does not necessarily have to be so implemented. In the case of a SIC used for data communications or control applications, the hardware may be optionally divided between the SIC module and the DTE/Payload units. In the case of a SIC used for telephone applications, the hardware may optionally be divided between the SIC, the DTE payload unit, and the telephone outlet, such as telephone outlet 625, which allows connections to both telephone services (such as through a telephone 623) and the local area network (such through DTE 628). Telephone outlet 625 may be a wall outlet or jack. All or part of the SIC may be housed within a telephone outlet such as telephone outlet 625, if desired. Furthermore, for SIC's used only as repeaters, a payload interface is not necessary.

Power/data splitter/combiner 510 (FIG. 5) can use various techniques known in the art. Coupling can be implemented, for example, as disclosed in U.S. Pat. No. 4,745,391 to Gajjar. Power-supply 520 (FIG. 5) can be connected to the network using dedicated adapter or via specific SIC. The payload can also be connected using standard Ethernet or other LAN interface, hence emulating the network using the SIC's. This configuration makes use of standard interfaces, but operates at higher throughput and data-rates than a conventional LAN.

SIC Addressing

A SIC can include an address. Addresses of SIC's on the network can be assigned via automatic assignment by the local area network itself by algorithms known in the art, for example as disclosed in U.S. Pat. No. 5,535,336 to Smith et al. Addresses can also be assigned via manual assignment, such as by the setting of mechanical switches on the SIC unit. Addresses can also be determined by the DTE connected to the SIC, either by means of higher layers as done in most LAN systems, or physically be means of the connection to the SIC (such as by address lines).

SIC Powering

Figure 7:
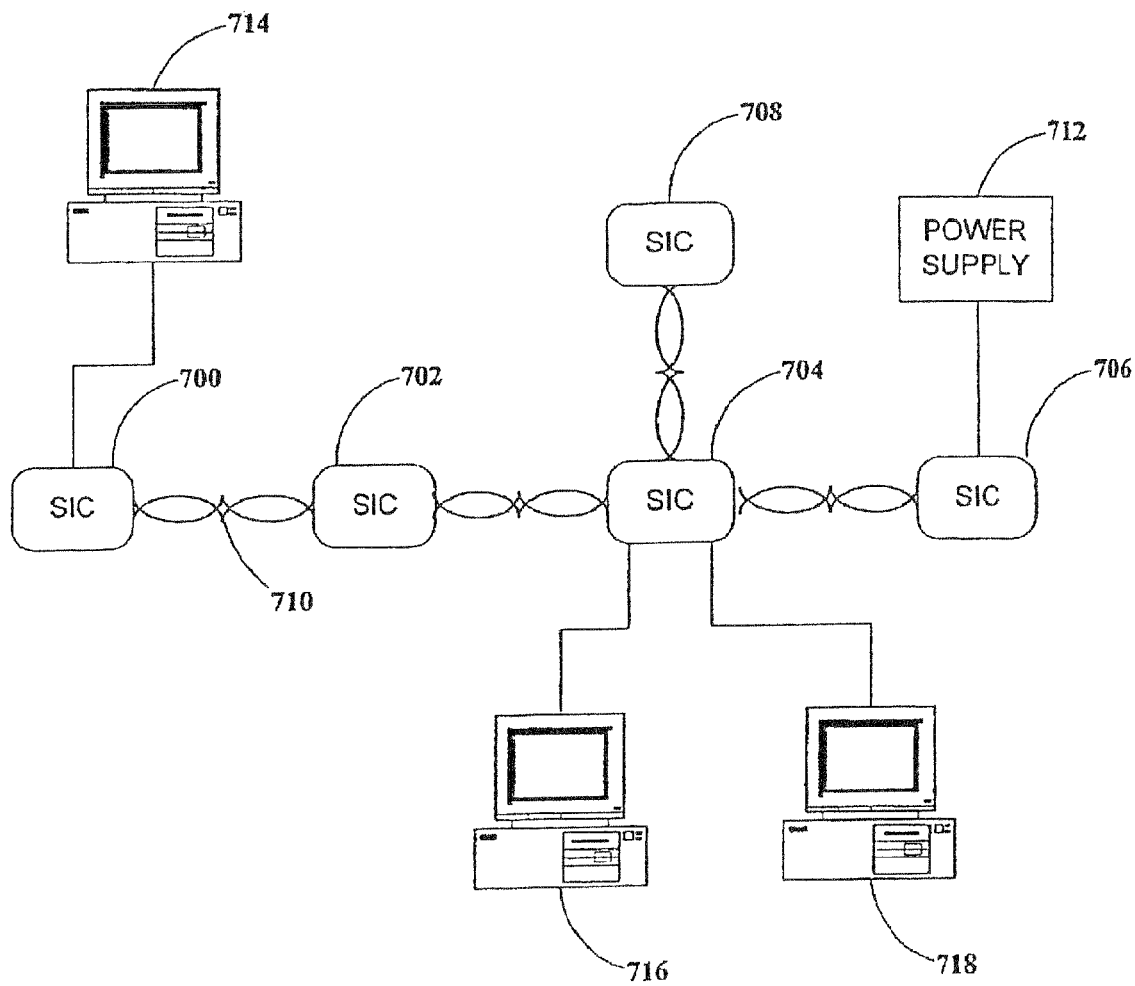
FIG. 7 shows a LAN topology utilizing the devices of the present invention.

A SIC can receive electrical power locally, via a power source located near the SIC. However, one power source may be used to power some or all the SIC's in the local area network using dedicated power lines. These lines can be routed with the data communication wires. Alternatively, the same electrically-conducting media (the data communication wires) can be used to carry both electrical power and local area network data to the SIC's, by means of techniques well-known in the art, for example as in telephone systems. In such a case, a unit is required for coupling the power supply to the local area network. This can make use of a SIC (such as SIC 706 in FIG. 7) or in a specific dedicated module. Since electrical power is typically distributed at low frequencies (e.g., 60 Hertz), whereas local area network data is typically at a much higher frequency, electrical power can be combined with local area network data using frequency-domain multiplexing. A SIC can therefore be powered from the electrical power mains, and can also deliver electrical power, as illustrated in FIG. 5 and detailed herein above.

The DTE's, sensors, and actuators connected to the SIC's can also be locally powered from the SIC's, or can use the same power resources via the same channels as the SIC's. Part or all of a SIC can be housed within an electrical outlet so that the electrical outlet allows connection to the local area network as well as to electrical power.

Control

Although mainly intended to be used as communication network, the system according to the present invention can also be used as a platform to implement a sensing, control, and automation system. This is achieved by adding to one or more of the SIC's interfaces to sensors or actuators. The signals received by the sensors are transmitted over the network via logic contained in the SIC's or in the DTE's, which thereupon operate the relevant actuators. This automation function can be monitored by one or more of the DTE's.

The operation of the control may be associated with data communicated over the network (for example, sensing the availability of power to a DTE) or may be independent of it, to allow control decisions to be made locally.

DTE Interface

The DTE interface can be a proprietary interface or any standard serial or parallel interface, such as ITU-T V.35, ITU-T V.24, etc. In addition, a telephone interface (POTS) or ISDN may be used. This can suit intercom or PBX applications.

Fault Protection

Figure 8:
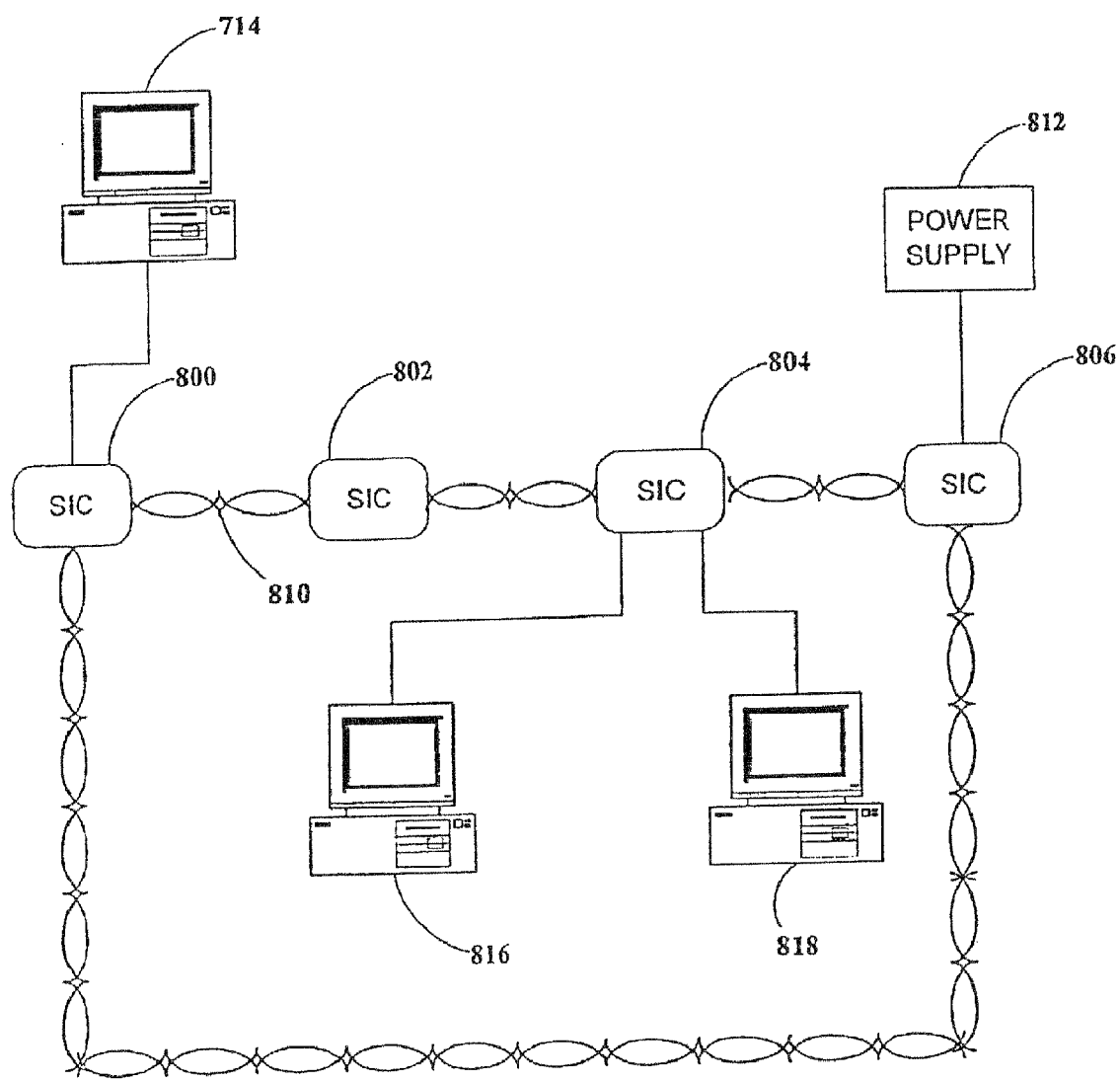
FIG. 8 shows an alternative LAN topology utilizing the devices of the present invention.

The SIC topology described above can be modified to allow for single failure correction. In such a case, the SIC's are connected in a network with redundant paths, such as a circular topology as shown in FIG. 8. In this example, a SIC 800 is connected to a SIC 802, which is in turn connected to a SIC 804, which is in turn connected to a SIC 806, which is in turn connected to SIC 800. When connected in such configuration, any single failure in any conductor, such as in conductor pair 810, will not effect the system operation, as data routing from any SIC to any other SIC can be achieved via an alternate path. The term "circular topology" herein denotes the topology of any local area network of SIC's according to the present invention which contains at least two communication paths between two different SIC's. For example, in FIG. 8, there are two communication paths from SIC 800 to SIC 804: one communication path is from SIC 800 to SIC 802 to SIC 804, and the other path is from SIC 800 to SIC 806 to SIC 804. Circular topology provides redundant communication paths that increase the immunity of the local area network to communication faults. It should be noted that the circular topology according to the present invention, as shown in FIG. 8, differs significantly from the well-known "Token Ring topology" of the prior art, as discussed following Although circular topology as defined herein can be superficially similar to the Token Ring topology, there are major differences between them. One difference is in the data framing. The Token Ring uses the same frame structure throughout all communication links in the network, and this requires that the same framing must be recognized by all the cells in the network. In the SIC network according to the present invention, however, each communication link (between any two connected SIC's) is totally independent from all other network communication. Hence, a first SIC can communicate with a second SIC using one type of frame structure and protocol, while the same first SIC can communicate with a third SIC using a different type of frame structure and protocol.

In addition, in a Token Ring network, there is single direction of data flow at any given time from a single transmitter to one or more receivers, and usually, the direction of data flow is constant. The SIC network according to the present invention, however, does not impose any limitation on the data flow in any of the communication links. Full duplex, half duplex or unidirectional communication is possible, and can even vary from link to link throughout the network. This allows the SIC network to support two independent communication routes simultaneously, provided different segments are used. In FIG. 8, for example, SIC 800 can communicate with SIC 802 while SIC 804 simultaneously communicates different data with SIC 806. This capability is not supported by any of the other network configurations.

The above differences affect, for example, the vulnerability of the respective networks to faults. In case of single break or short-circuit anywhere in the medium, the Token Ring network will collapse, disabling any further communication in the system. As another example, in the network disclosed in U.S. Pat. No. 4,918,690 to Markkula et al. (hereinafter referred to as "Markkula"), this fault affects the physical layer by disabling the media's signal-carrying capability. The Token Ring network will not function at all since the data layer functionality based on unidirectional transmission will not be supported. In contrast, however, a SIC network according to the present invention, will continue to function fully, except for the specific faulty link itself. All other links continue to function normally. Furthermore, the ability to localize the fault is not easily performed either in a Token Ring network or in the Markkula network. In the SIC network according to the present invention, however, it is simple and straightforward to trace the fault to the affected link.

Data Distribution over Electrical Power Lines

An important configuration for a network according to the present invention uses the electrical power wiring of a building as a communication media. This can be used, for example, to implement an inexpensive 'home LAN'. Typical house mains have a connection to single feeder with numerous distribution points and outlets. The principles according to the present invention specify a SIC to be located within each outlet and at each distribution point. This will allow SIC-based communications network, where communication takes place between each pair of SIC's connected via the wiring. In such a case it is also expected that the mains will also be used to power the SIC's. Aside from using the same wiring media, the electrical distribution and the communication system sharing the same mains can be totally decoupled.

Another configuration involves adding the SIC to the Mains wiring at points distinguished from the mains outlets. The preferred embodiment, however, consists of using the outlets points for both the electrical supply and the DTE connection points. This involves replacing all electrical outlets and distribution points with 'smart' outlets, having both electrical connections and a communications jack. In addition, such unit may include visual indicators (e.g. LED's) to show the communication status, and may also include switches or other means to determine the outlet address. Such a communication system could be used for applications associated with power distribution, as for example to control the load connected to a specific outlet, for remote on/off operation of appliances, timing of operations, delayed start, disconnection after pre-set time period, and so forth. Such a communication system could also be used to monitor the power consumed by specific outlets, such as for Demand Side Management (DSM) or Automatic Meter Reading (AMR), allowing remote meter reading.

The above described topology may also apply to existing wiring. One common example may be power wiring to consumers located in different locations. Such wiring typically relies on bus topology with taps. In order to use SIC technology, the wiring must be broken, and a SIC installed between both ends.

In a similar manner, a communication network employing the electrical power wiring of vehicles and vessel can be implemented, such as for aircraft, ships, trains, buses, automobiles, and so forth.

Implementing a Local Communication/Telephone System Using SIC's

In this application, existing telephone wiring (either POTS or ISDN) is used as the electrically-conducting media for the local area network, and is used for both local area network data communication and for telephony. The term "telephony" herein denotes any telephone or telephonic communication, including both including voice (POTS) and data (ISDN). Telephone outlets are usually connected in point-to-point topology without a distribution point. To set up a network, each outlet is replaced with SIC-based outlet. If there are distribution points, these distribution points must also be SIC equipped. This configuration results in a high-performance LAN between the telephone outlets. Aside from sharing the same media, the local area network can be decoupled from the telephone system. Alternatively, the local area network and the telephone system can be combined, such that telephony is digitally integrated into the local area network data.

The outside telephone service can be treated according to one of the following alternatives:

1. No telephone support. In this configuration, the connection to the network (usually to the public network) is cut, and the network is fully internal, with no external telephone service.

2. Telephone as Payload. In this configuration, the telephone capability is retained, and telephony data may be integrated into the data communication of the local area network. One of the SIC's (usually the one closest to a public telephone network interface) or other dedicated module interconnects (via the communication interface for example) to the network interface (NI). This unit emulates a telephone interface to the NI, so that public network operation is transparent and continues to perform as normal. However, the signals associated with the telephone interface, either the voice itself and the control/signaling (on hook/off hook, ringing, etc.) are digitized and transmitted in the network as data stream, as part of the communication taking place in the network. In the SIC's interfaced to telephones, these signals are converted back to analog (or in any original form) and thus can be used with standard telephones. In this case, telephone functionality is fully retained. However, failure in the communication network may result in loss of the telephone service. This can be improved by means of a system which disconnects the SIC's circuitry and restores the original wiring routing (this can be easily implemented by relays, which bypass the SIC's upon failure detection, manual intervention, or other relevant occasion).

3. Communication over POTS or ISDN. In this method, the electrically-conducting media interconnecting SIC's is the telephone wiring of a building. This method involves the known mechanism 'POTS Splitting', currently used in conjunction with xDSL technologies. This requires a filter which separates the low-frequency portion of the spectrum (usually carrying the POTS associated signals and power) from the high-frequency portion of the spectrum (used for communication). In such an application, the AC/DC units in the SIC are replaced with such POTS splitter modules. The low-frequency band (POTS related) is passed transparently (similar to the power pass), and branched to the telephone jack. The high-frequency band is used for the communication between the SIC's. This combining of high-frequency local area network communication on the same electrically-conducting media with low-frequency telephony data is a form of frequency-domain multiplexing.

In the latter two alternatives, each in-wall telephone outlet is replaced with a SIC based outlet having both a telephone jack and one (or more) communication jacks.

Computer Bus Extender

Figure 10:
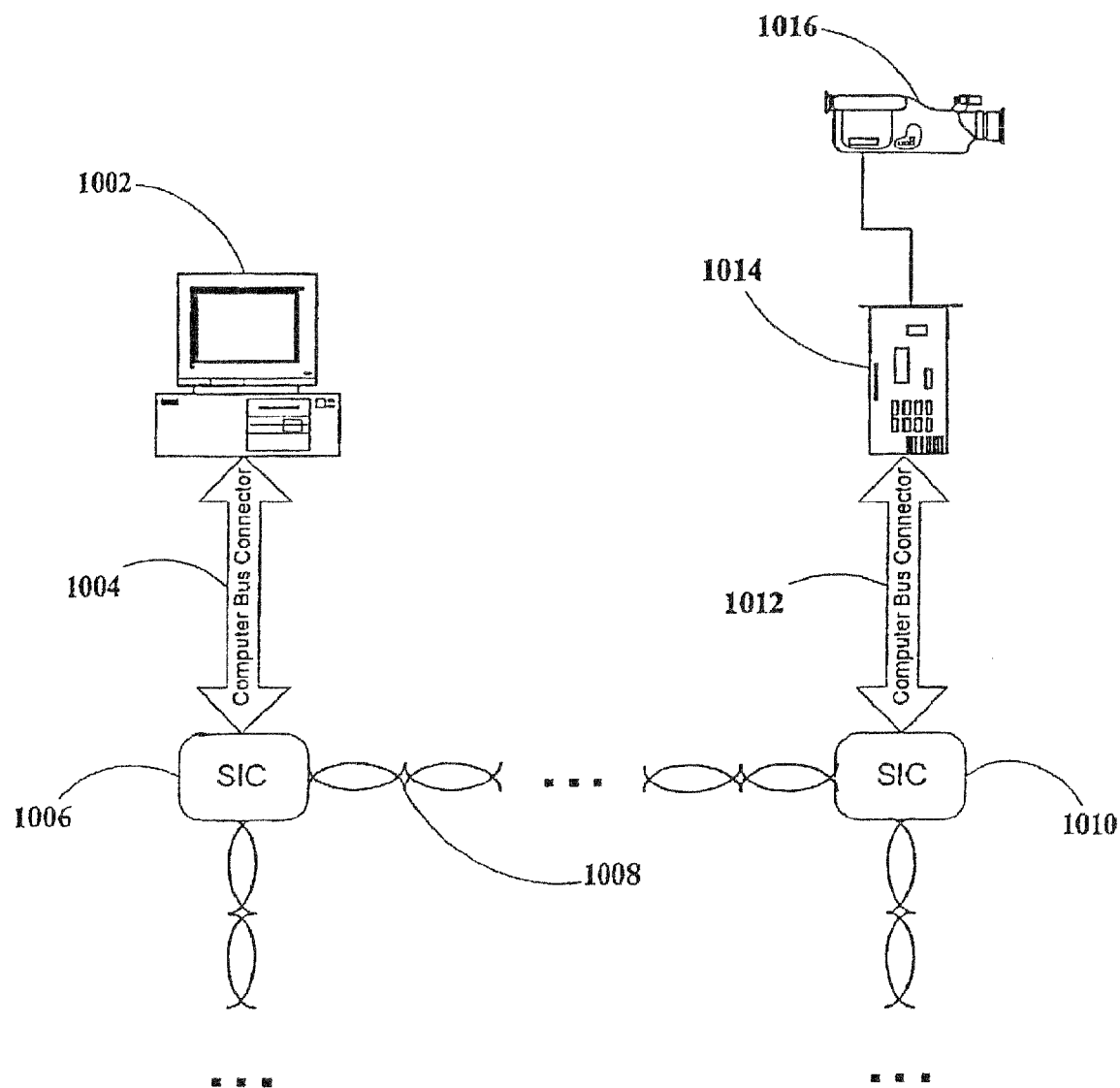
FIG. 10 shows a local area network according to the present invention used as a computer bus extender.

The SIC network can be used as a computer bus extender, such as an 'ISA bus extender', as illustrated in FIG. 10. In this configuration, a SIC 1006 is equipped with a computer bus connector 1004 which is connected, for example, to one of the ISA bus slots in a computer 1002, to transport data between the local area network and computer 1002. Another SIC 1010, remotely located, also has a computer bus connector 1012, such as an ISA bus extender. This allows for a transparent ISA bus capability, where the ISA bus data will be transported in both directions over electrically-conducting medium 1008. The ellipses ( . . . ) indicate that additional SIC's and electrically-conducting media may be present in the local area network between SIC 1006 and SIC 1010. Shown as an example, a video frame grabber card 1014 is plugged into computer bus connector 1012, and a video camera 1016 is connected to video frame grabber card 1014. Normally, video frame grabber card 1014 is plugged directly into an ISA bus slot, such as in computer 1002. Here, however, the local area network acts as a bus extender so that video frame grabber 1014 and video camera 1016 can be located remotely from computer 1002. The normal software driver for the ISA bus slot in computer 1002 can used, since computer 1002 is unaware of the fact that only ISA emulation is taking place. This way, the capability of having general remote PC components and peripherals can be easily achieved. This configuration features the above-described advantages, and this method can be used to attain various goals, such as fault protection. Similarly, this method can be used to connect several units remotely to a computer, using different ports in the computer.

Implementing Multiplexers and PABX/PBX Functionality

Figure 9:
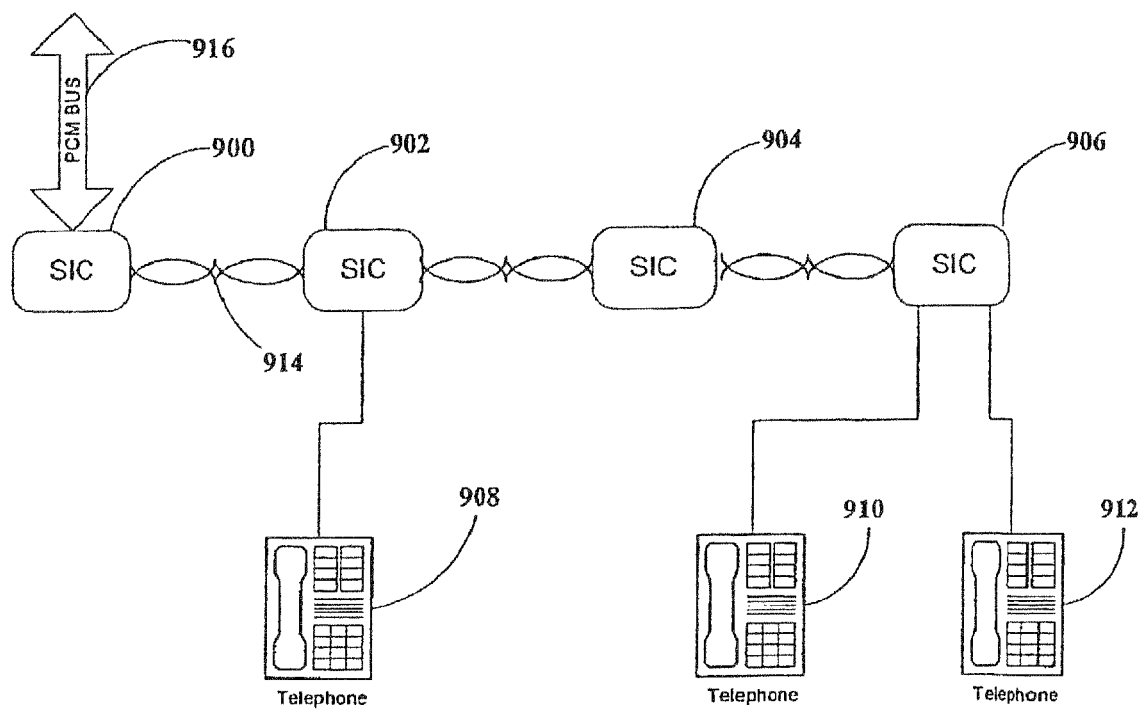
FIG. 9 shows a SIC-based multiplexer—PABX/PBX according to the present invention.

A network of SIC's may be used to implement a multiplexer or a PABX/PBX functionality, as illustrated in FIG. 9. In this example, a SIC 900 is connected to a high data rate connection, such as PCM bus 916, while SIC 902 and SIC 906 are connected to telephones 908, 910, and 912. SIC 904 functions as a repeater in this example.

In this example, the local area network functions as a multiplexer, wherein the bandwidth of the high data rate connection (PCM bus 916) is multiplexed through SIC 900 to SIC 902 and SIC 906, each of which may use a different portion of the bandwidth of the high data rate connection (PCM bus 916). Moreover, by the addition of telephones 908, 910, and 912, the local area network of FIG. 9 functions as a voice multiplexer.

A number of applications of the present invention have been discussed above. Additional applications include, but are not limited to: intercom, PABX/PBX, security systems, video surveillance, entertainment broadcasting services, time (clock) distribution, and audio/video signal distribution. The networks implemented by the present invention can extend locally within a single building or over a neighborhood.

While the invention has been described with respect to a limited number of embodiments and applications, it will be appreciated that many variations, modifications and other applications of the invention may be made.

What is claimed is:

1. A device for use with AC power wiring, the wiring being connected to carry an AC power signal, said device comprising:

an AC power connector configured for connecting to the AC power wiring;

a first data port configured for coupling to a first Digital Terminal Equipment (DTE);

a first data transceiver coupled to said first data port for bi-directional, serial digital data communication with the first DTE, said first data transceiver being operative to communicate with a mating data transceiver of substantially the same type;

a power supply comprising an AC/DC converter connected between said AC power connector and said first data transceiver, said power supply being connected to be powered by the AC power signal and to supply DC operating power to said first data transceiver;

a visual indicator connected to said power supply for indicating a status; and a single enclosure housing said AC power connector, said first data port, said first data transceiver, said power supply and said visual indicator;

wherein said first data transceiver is a Local Area Network (LAN) transceiver, and said device is addressable in a LAN, and wherein said device further comprises: a second data port for coupling to a second Digital Terminal Equipment (DTE); and a second data transceiver coupled to said second data port for bi-directional packet-based serial digital data communication with the second DTE, wherein said first data transceiver and said second data transceiver are coupled to each other for passing at least part of the digital data between the first DTE and the second DTE.

2. The device according to claim 1, wherein said device is wall mountable in the AC power outlet opening or pluggable into an existing AC power outlet.

3. The device according to claim 1, wherein: communication with the first DTE is over a wired medium; said first data port comprises a connector; and said first data transceiver is a wired LAN transceiver.

4. The device according to claim 3, wherein said first data transceiver is operative for full duplex communication with the first DTE.

5. The device according to claim 3, wherein said first data transceiver is operative for point-to-point communication only with a single mating transceiver of substantially the same type.

6. The device according to claim 3, wherein said LAN transceiver is operative to conduct bidirectional communication with one or more substantially similar transceivers over a LAN wiring.

7. The device according to claim 3, wherein said data connector and said first data transceiver cooperatively form a digital data interface substantially conforming to Ethernet standard.

8. The device according to claim 1, wherein: said device is further operative to pass the AC power signal to power an AC powered appliance; and said device further comprises an AC power jack connected to said AC power connector and connectable to the AC powered appliance for AC powering the AC powered appliance from the AC power signal.

9. The device according to claim 1, wherein said device is further operative for coupling to an analog unit, and said device further comprises: an analog connector for coupling an analog signal to the analog unit; and a converter between analog and digital data signals coupled between said first data port and said analog connector.

10. The device according to claim 9, wherein the analog unit is an analog sensor for sensing a physical phenomenon, and said converter is an analog to digital converter.

11. The device according to claim 9, wherein the analog unit is an analog actuator for creating a physical phenomenon, and said converter is a digital to analog converter.

12. The device according to claim 9, wherein the analog unit is one of an audio unit and a video unit and the analog signal is one of an audio signal and a video signal, respectively.

13. A device for use with AC power wiring, the wiring being connected to carry an AC power signal, said device comprising:
- an AC power connector configured for connecting to the AC power wiring;
- a first data port configured for coupling to a first Digital Terminal Equipment (DTE);
- a first data transceiver coupled to said first data port for bi-directional, serial digital data communication with the first DTE;
- a second data port configured for coupling to a second Digital Terminal Equipment (DTE);
- a second data transceiver coupled to said second data port for bi-directional, serial digital data communication with the second DTE;
- a power supply comprising an AC/DC converter connected between said AC power connector and said first and second data transceivers, said power supply being connected to be powered by the AC power signal and to supply DC operating power to said first and second data transceivers;
- a visual indicator connected to said power supply for indicating a status; and
- a single enclosure housing said AC power connector, said first and second data ports, said first and second data transceivers, said power supply and said visual indicator, wherein: at least one of said first and second data transceivers is a Local Area Network (LAN) transceiver; said first and second data transceivers are coupled to each other for passing data between the first and second DTEs; and wherein said device is addressable in a LAN.

14. The device according to claim 13, wherein said device is wall mountable in the AC power outlet opening or pluggable into an existing AC power outlet.

15. The device according to claim 13, wherein communication with said first and second DTEs is over a wired medium, each of said data ports comprises a connector, and said first and second data transceivers are each a wired LAN transceiver.

16. The device according to claim 15, wherein each of said first and second data transceivers is operative for full duplex communication with the respective DTE.

17. The device according to claim 15, wherein each of said first and second data transceivers is operative for point-to-point communication only with a single mating transceiver of substantially the same type.

18. The device according to claim 15, wherein each of said LAN transceivers is operative to conduct bidirectional communication with one or more substantially similar transceivers over a LAN wiring.

19. The device according to claim 15, wherein said data connector and said first data transceiver cooperatively form a digital data interface substantially conforming to Ethernet standard.

20. The device according to claim 13, wherein: said device is further operative to pass the AC power signal to power an AC powered appliance; and said device further comprises an AC power jack connected to said AC power connector and connectable to the AC powered appliance for AC powering the AC powered appliance from the AC power signal.

21. The device according to claim 13, wherein said device is further operative for coupling to an analog unit, and said device further comprises: an analog connector for coupling an analog signal to the analog unit; and a converter between analog and digital data signals coupled between said first data port and said analog connector.

22. The device according to claim 21, wherein the analog unit is an analog sensor for sensing a physical phenomenon, and said converter is an analog to digital converter.

23. The device according to claim 21, wherein the analog unit is an analog actuator for creating a physical phenomenon, and said converter is a digital to analog converter.

24. The device according to claim 21, wherein the analog unit is one of an audio unit and a video unit and the analog signal is one of an audio signal and a video signal, respectively.

25. A device for coupling an analog unit to a DTE for use with AC power wiring, the wiring being connected to carry an AC power signal, said device comprising:
- an AC power connector configured for connecting to the AC power wiring;
- a first data port configured for coupling to a first Digital Terminal Equipment (DTE);
- a first data transceiver coupled to said first data port for bi-directional, serial digital data communication with the first DTE, said first data transceiver being operative to communicate with a mating data transceiver of substantially the same type;
- a power supply comprising an AC/DC converter connected between said AC power connector and said first data transceiver, said power supply being connected to be powered by the AC power signal and to supply DC operating power to said first data transceiver;

a visual indicator connected to said power supply for indicating a status;

an analog connector connectable to an analog unit for coupling an analog signal to the analog unit;

a converter between analog and digital data signals coupled between said first data port and said analog connector; and a single enclosure housing said AC power connector, said first data port, said first data transceiver, said analog connector, said converter, said power supply and said visual indicator;

wherein said first data transceiver is a Local Area Network (LAN) transceiver, and wherein said device further comprises: a second data port for coupling to a second Digital Terminal Equipment (DTE); and a second data transceiver coupled to said second data port for bi-directional packet-based serial digital data communication with the second DTE, wherein said first data transceiver and said second data transceiver are coupled to each other for passing at of the digital data between the first DTE and the second DTE.

26. The device according to claim 25, wherein said device is addressable in a LAN.

27. The device according to claim 25, wherein: communication with the first DTE is over a wired medium; said first data port comprises a connector; and said first data transceiver is a wired LAN transceiver.

28. The device according to claim 27, wherein said first data transceiver is operative for full duplex communication with the first DTE.

29. The device according to claim 27, wherein said first data transceiver is operative for point-to-point communication only with a single mating transceiver of substantially the same type.

30. The device according to claim 27, wherein said LAN transceiver is operative to conduct bidirectional communication with one or more substantially similar transceivers over a LAN wiring.

31. The device according to claim 27, wherein said data connector and said first data transceiver cooperatively form a digital data interface substantially conforming to Ethernet standard.

32. The device according to claim 25, wherein: said device is further operative to pass the AC power signal to power an AC powered appliance; and said device further comprises an AC power jack connected to said AC power connector and connectable to the AC powered appliance for AC powering the AC powered appliance from the AC power signal.

33. The device according to claim 25, wherein said device is wall mountable in the AC power outlet opening or pluggable into an existing AC power outlet.

34. The device according to claim 25, wherein the analog unit is an analog sensor for sensing a physical phenomenon, and said converter is an analog to digital converter.

35. The device according to claim 25, wherein the analog unit is an analog actuator for creating a physical phenomenon, and said converter is a digital to analog converter.

36. The device according to claim 25, wherein the analog unit is one of an audio unit and a video unit and the analog signal is one of an audio signal and a video signal, respectively.

37. A device for use with AC power wiring, the wiring being connected to carry an AC power signal, said device comprising:

an AC power connector configured for connecting to the AC power wiring;

a first data port configured for coupling to a first Digital Terminal Equipment (DTE);

a first data transceiver coupled to said first data port for bi-directional, serial digital data communication with the first DTE;

a second data port for coupling to a second Digital Terminal Equipment (DTE);

a second data transceiver coupled to said second data port for bi-directional, serial digital data communication with the second DTE;

a power supply comprising an AC/DC converter connected between said AC power connector and said first and second data transceivers, said power supply being connected to be powered by the AC power signal and to supply DC operating power to said first and second data transceivers;

an analog connector connectable to an analog unit for coupling an analog signal to the analog unit;

a converter between analog and digital data signals coupled between said first data port and said analog connector;

a visual indicator connected to said power supply for indicating a status; and a single enclosure housing said AC power connector, said first and second data ports, said first and second data transceivers, said analog connector, said converter, said power supply and said visual indicator, wherein: at least one of said first and second data transceivers is a Local Area Network (LAN) transceiver; and said first and second data transceivers are coupled to each other for passing data between the first and second DTEs.

38. The device according to claim 37, wherein said device is addressable in a LAN.

39. The device according to claim 37, wherein communication with said first and second DTEs is over a wired medium, each of said data ports comprises a connector, and said first and second data transceivers are each a wired LAN transceiver.

40. The device according to claim 39, wherein each of said first and second data transceivers is operative for full duplex communication with the respective DTE.

41. The device according to claim 39, wherein each of said first and second data transceivers is operative for point-to-point communication only with a single mating transceiver of substantially the same type.

42. The device according to claim 39, wherein each of said LAN transceivers is operative to conduct bidirectional communication with one or more substantially similar transceivers over a LAN wiring.

43. The device according to claim 39, wherein said data connector and said first data transceiver cooperatively form a digital data interface substantially conforming to Ethernet standard.

44. The device according to claim 37, wherein: said device is further operative to pass the AC power signal to power an AC powered appliance; and said device further comprises an AC power jack connected to said AC power connector and connectable to the AC powered appliance for AC powering the AC powered appliance from the AC power signal.

45. The device according to claim 37, wherein said device is wall mountable in the AC power outlet opening or pluggable into an existing AC power outlet.

46. The device according to claim 37, wherein the analog unit is an analog sensor for sensing a physical phenomenon, and said converter is an analog to digital converter.

47. The device according to claim 37, wherein the analog unit is an analog actuator for creating a physical phenomenon, and said converter is a digital to analog converter.

48. The device according to claim 37, wherein the analog unit is one of an audio unit and a video unit and the analog signal is one of an audio signal and a video signal, respectively.

49. A device for coupling power and digital data in a network, for use with first and second point-to-point network wiring segments each comprising at least one twisted-wire pair and carrying DC power and digital data signals, the device comprising:
- a first transceiver configured for first full duplex serial digital data communication over the first wiring segment;
- a second transceiver configured for second full-duplex serial digital data communication over the second wiring segment;
- a third transceiver coupled to the first and second transceivers for full-duplex digital data communication with a data unit that is connectable to the device, and
- the device is configured for:
  i) coupling a first DC power signal and the first full-duplex serial digital data to the first wiring segment;
  ii) coupling a second DC power signal and the second full-duplex serial digital data to the second wiring segment; and
  iii) enabling coupling between the first and second full-duplex serial digital data and the data unit,
- wherein the first and second full-duplex serial digital data are independent from each other.

50. The device according to claim 49, further comprising a power connector for coupling to a power source that supplies the first and second DC power signals.

51. The device according to claim 50, further comprising a first connector for connecting to the first wiring segment and a second connector for connecting to the second wiring segment.

52. The device according to claim 51, further comprising first and second current limiting circuits respectively coupled between said power connector and the first and second connectors for respectively current limiting of the first and second DC power signals.

53. The device according to claim 49, wherein the first and second full-duplex serial digital data communication is packet-based communication, and the device is addressable.

54. The device according to claim 53, wherein the device has a manually assigned address.

55. The device according to claim 53, wherein the device has an automatically assigned address.

56. The device according to claim 53, wherein the device has an address assigned by the data unit or a further data unit coupled to the device.

57. The device according to claim 49 further functioning as a multiplexer, wherein the communication with the data unit includes communication of a serial digital data stream carrying time multiplexed first and second data streams, and wherein the first data stream is coupled only to the first transceiver, and the second data stream is coupled only to the second transceiver.

58. The device according to claim 49, further comprising a data connector coupled to the third transceiver for connecting to the data unit.

59. A local area network comprising the device as claimed in claim 49.

60. The device according to claim 49, wherein the device has a manually assigned address.

61. The device according to claim 49, wherein the device has an automatically assigned address.

62. The device according to claim 49, wherein the device has an address assigned by the data unit or a further data unit coupled to the device.

63. The device according to claim 49, wherein the device is adapted to be mounted on a wall.

64. The device according to claim 49, wherein the device is configured to function as a multiplexer.

* * * * *